US010112648B2

(12) United States Patent
Tamura et al.

(10) Patent No.: US 10,112,648 B2
(45) Date of Patent: Oct. 30, 2018

(54) VEHICLE STEERING DEVICE

(71) Applicant: HONDA MOTOR CO., LTD., Tokyo (JP)

(72) Inventors: Norifumi Tamura, Wako (JP); Yuki Endo, Wako (JP); Takeshi Iijima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 73 days.

(21) Appl. No.: 15/277,004

(22) Filed: Sep. 27, 2016

(65) Prior Publication Data

US 2017/0088176 A1  Mar. 30, 2017

(30) Foreign Application Priority Data

Sep. 28, 2015 (JP) ................. 2015-190165

(51) Int. Cl.
| B62D 6/00 | (2006.01) |
| B62D 6/02 | (2006.01) |
| B62D 6/04 | (2006.01) |
| B62D 15/02 | (2006.01) |
| B60W 30/14 | (2006.01) |
| B60W 30/16 | (2012.01) |
| B62D 5/04 | (2006.01) |
| B60W 30/10 | (2006.01) |

(52) U.S. Cl.
CPC .......... B62D 15/026 (2013.01); B60W 30/10 (2013.01); B60W 30/146 (2013.01); B60W 30/162 (2013.01); B62D 5/0463 (2013.01); B62D 6/04 (2013.01); B62D 15/021 (2013.01); B60W 2520/10 (2013.01); B60W 2540/18 (2013.01); B60W 2710/20 (2013.01); B60W 2750/30 (2013.01)

(58) Field of Classification Search
None
See application file for complete search history.

(56) References Cited

U.S. PATENT DOCUMENTS

| 2009/0271072 A1* | 10/2009 | Yamazaki ........... B60T 8/17552 |
| | | 701/41 |
| 2011/0022270 A1* | 1/2011 | Tamaizumi .......... B62D 5/0463 |
| | | 701/41 |
| 2012/0296525 A1* | 11/2012 | Endo .................... B62D 5/0466 |
| | | 701/42 |

FOREIGN PATENT DOCUMENTS

JP       2015-037932 A    2/2015

* cited by examiner

Primary Examiner — Adam D Tissot
(74) Attorney, Agent, or Firm — Westerman, Hattori, Daniels & Adrian, LLP

(57) ABSTRACT

A vehicle steering device includes an electric motor; a steering angle sensor; a steering torque sensor; a wheel speed sensor; a cruise controller; and a wheel-alignment support controller configured to compute an anti-one-side pull current value fed to the electric motor for suppressing a one-side pull behavior of a vehicle. The wheel-alignment support controller calculates, according to an integrated torque value, the amount of displacement of an anti-one-side pull steering angle value that corresponds to a midpoint steering angle of a steering system for suppressing the one-side pull behavior of the vehicle. When the vehicle is under cruise control and the vehicle speed is below a first threshold Vth1, the wheel-alignment support controller makes the amount of displacement of the anti-one-side pull steering angle value smaller than that obtained when the vehicle speed is equal to or above the first threshold Vth1.

13 Claims, 12 Drawing Sheets

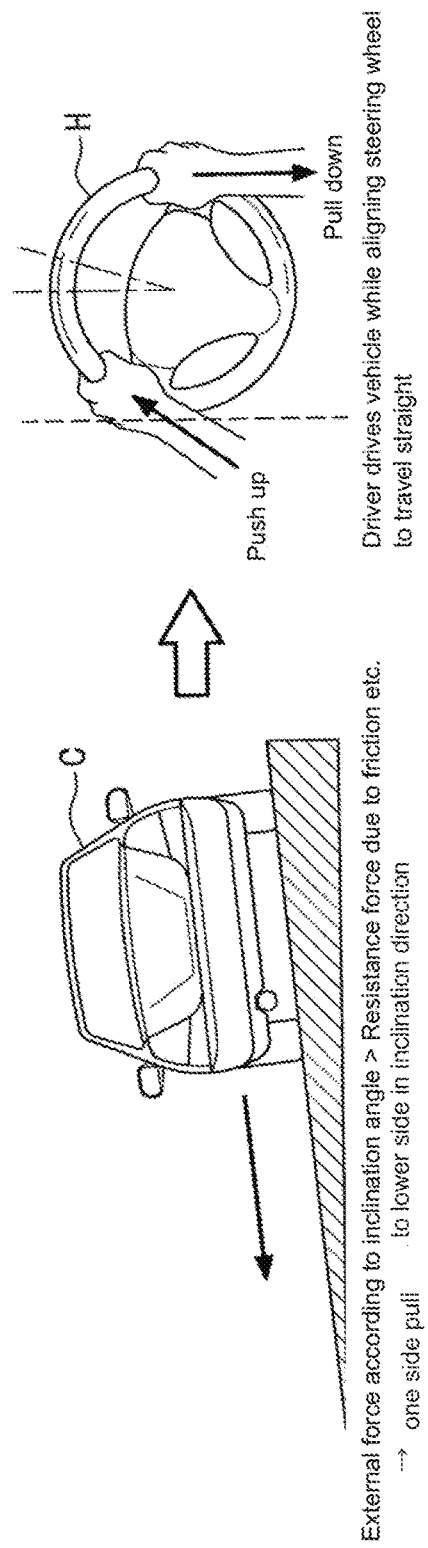

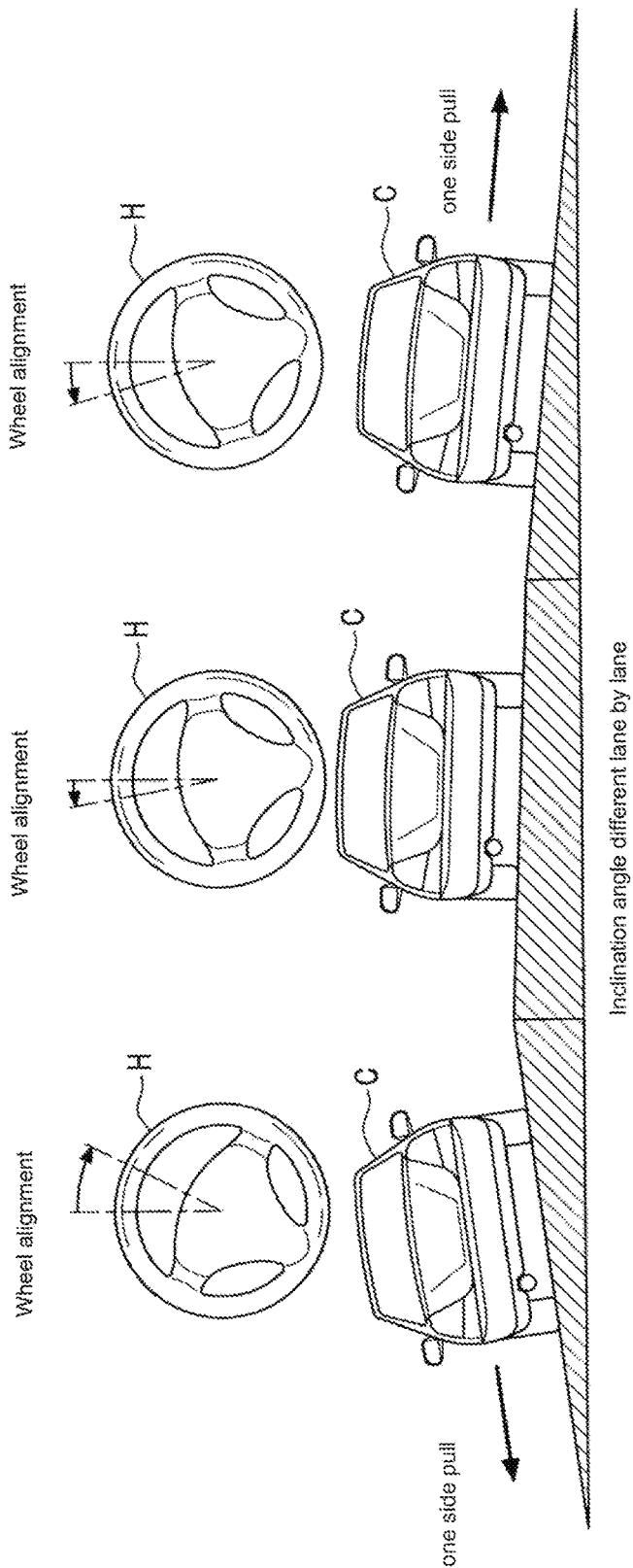

Fig.7A
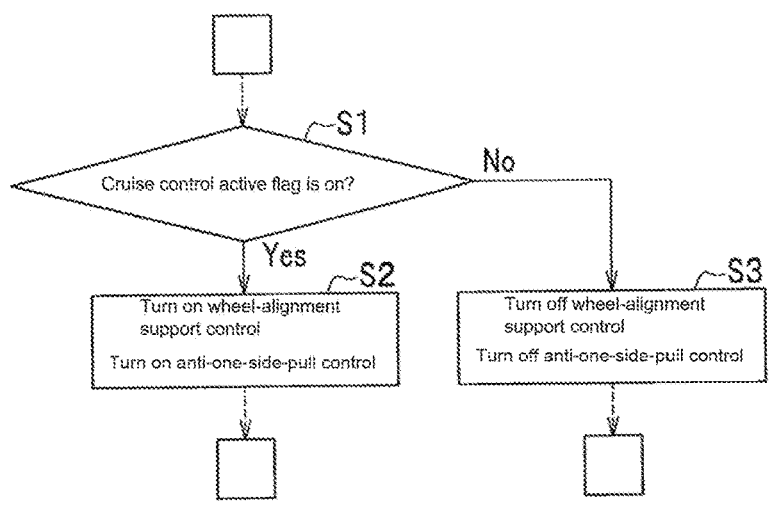
Fig.7B
(a) CC switch position-temporal transition
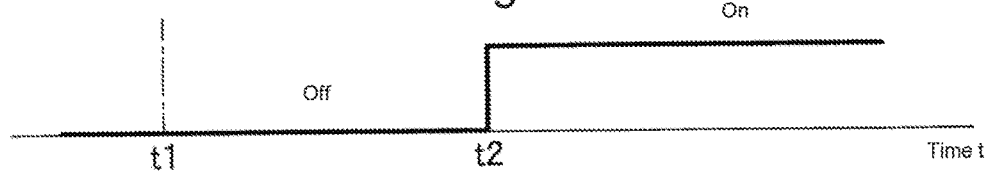
(b) Actual steering angle-temporal transition
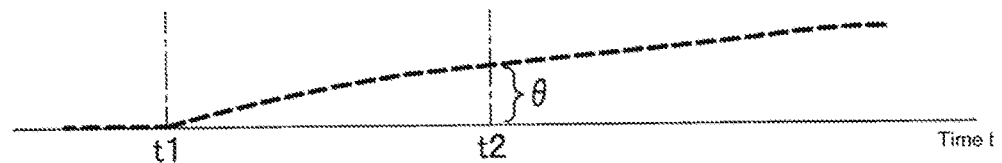
(c) Anti-one-side-pull steering angle-temporal transition
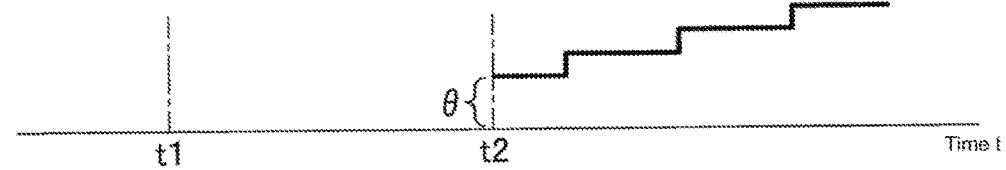
(d) Anti-one-side-pull steering angle-temporal transition
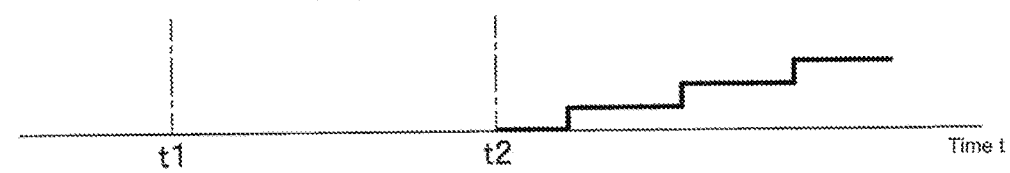

VEHICLE STEERING DEVICE

CROSS REFERENCE TO RELATED APPLICATIONS

The present application claims priority under 35 U.S.C. § 119 to Japanese Patent Application No. 2015-190165, filed Sep. 28, 2015, entitled "Vehicle Steering Device." The contents of this application are incorporated herein by reference in their entirety.

TECHNICAL FIELD

The present disclosure relates to a vehicle steering device equipped with a steering electric motor.

BACKGROUND

When a vehicle is traveling on a cant road having an inclination in its width direction, or when the vehicle is traveling in a crosswind, the vehicle drifts to the lower side in the inclination direction on the cant road under the influence of gravity, or drifts to the leeward side in the crosswind under the influence of wind power. Such a behavior is called a one-side pull of a vehicle. In order to keep driving the vehicle straight under cruise control against the one-side pull behavior of the vehicle, a driver needs to keep steering a steering wheel to the upper side in the inclination direction or to the windward side. To put it differently, in order to maintain straight travel of the vehicle in a situation where the one-side pull behavior of the vehicle occurs, the driver needs to continually provide a steering force in a direction opposite the direction the vehicle drifts (the direction of the one-side pull).

For example, Japanese Patent Application Publication No. 2015-37932 discloses a vehicle steering device having: an electric motor; a steering angle sensor; a steering torque sensor; and an EPS_ECU configured to control, when a vehicle is traveling straight, driving power of the electric motor based on vehicle information including a steering torque and a steering angle, and thereby perform control to apply an assist torque on a steering system. In the vehicle steering device according to Japanese Patent Application Publication No. 2015-37932, the EPS_ECU includes: an integrating unit configured to calculate an integrated torque value obtained by integrating the steering torque; and a wheel-alignment support controlling unit configured to perform anti-one-side pull control based on the integrated torque value when the integrated torque value is equal to or above a threshold.

According to the vehicle steering device of Japanese Patent Application Publication No. 2015-37932, it is possible to provide steering comfort to a driver even in a situation where the one-side pull behavior of the vehicle occurs during traveling on a cant road or during traveling in a crosswind, by executing anti-one-side pull control for suppressing the one-side pull behavior of the vehicle.

SUMMARY

In the vehicle steering device according to Japanese Patent Application Publication No. 2015-37932, the anti-one-side pull control is executed, for example, in association with cruise control that performs constant speed travel control on the vehicle. Well known cruise control is one which operates in various vehicle speed ranges from a high vehicle speed range to a low vehicle speed range (including stopping).

Meanwhile, the steering angle of a steering wheel for correcting the travel direction of a vehicle typically tends to increase in the low vehicle speed range as compared with those in the high vehicle speed range and the middle vehicle speed range. In particular, since the anti-one-side pull control moves the midpoint steering angle (hereinafter sometimes simply referred to as the "midpoint") of the steering system based on the integrated torque value (in order to suppress the one-side pull behavior of the vehicle), movement of the midpoint to an improper steering angle value (fluctuations of an anti-one-side pull steering angle value) is likely to occur.

For this reason, when the vehicle speed of the vehicle transitions to the high vehicle speed range through the low vehicle speed range while the anti-one-side pull control is in operation, it might take time until the midpoint converges (fluctuations of the anti-one-side pull steering angle value converge) to a steering angle at which the one-side pull behavior of the vehicle can be suppressed, and therefore the driver might keep feeling a sense of discomfort during this period.

Thus, it is preferable to provide a vehicle steering device capable of providing steering comfort to a driver, even if the speed of a vehicle transitions to a high vehicle speed range through a low vehicle speed range when the driver is driving the vehicle straight under cruise control in a situation where the one-side pull behavior of the vehicle occurs such as during traveling on a cant road or during traveling in a crosswind.

For example, a vehicle steering device according to first aspect of embodiments is based on a vehicle steering device including: an electric motor configured to apply an assist torque to assist in steering a steering system of a vehicle; a steering torque detecting unit configured to detect a steering torque required for steering the steering system; a steering angle detecting unit configured to detect a steering angle of the steering system; a vehicle speed detecting unit configured to detect a vehicle speed; a cruise control unit configured to perform cruise control on the vehicle; and a controller configured to control a driving current of the electric motor based on the steering torque and thereby perform control to apply the assist torque on the steering system.

The controller further includes an anti-one-side pull controlling unit configured to compute an anti-one-side pull current value that is to be fed to the electric motor for suppressing a one-side pull behavior of the vehicle. The anti-one-side pull controlling unit has: an integrating unit configured to calculate an integrated torque value that is an integrated value of the steering torque; an anti-one-side pull steering angle value calculating unit configured to calculate, according to the integrated torque value, the amount of displacement of an anti-one-side pull steering angle value that corresponds to a midpoint steering angle of the steering system for suppressing the one-side pull behavior of the vehicle; and a mapping information storing unit configured to store mapping information in which the amount of displacement of the anti-one-side pull steering angle value and the anti-one-side pull current value corresponding thereto are associated with each other.

One feature of this device is that the anti-one-side pull controlling unit computes the anti-one-side pull current value corresponding to the amount of displacement of the anti-one-side pull steering angle value with reference to the mapping information, and, when the vehicle is under the cruise control and the vehicle speed is below a predetermined threshold, performs control to make the amount of displacement of the anti-one-side pull steering angle value smaller than that obtained when the vehicle speed is equal to or above the predetermined threshold.

Now consider a case where the driver drives the vehicle straight under cruise control in a situation where the vehicle drifts to the left in its travel direction under the influence of a disturbance such as a cant road or a crosswind. In this case, the driver attempts to drive the vehicle straight under cruise control against the tendency of the vehicle to drift to the left in the travel direction, by keeping steering the steering wheel to the right in the travel direction. In this situation, anti-one-side pull control is performed to suppress the one-side pull behavior of the vehicle by reducing the steering torque to the right in the travel direction based on the integrated value of the torque to the right in the travel direction. This reduces a physical burden on the driver, who is otherwise forced to keep steering the steering wheel to the right in the travel direction.

In addition, when the vehicle is under cruise control and the vehicle speed is below the predetermined threshold (e.g., 40 km per hour; corresponding to the third threshold Vth3), the anti-one-side pull controlling unit makes the amount of displacement of the anti-one-side pull steering angle value smaller than that obtained when the vehicle speed is equal to or above the predetermined threshold. As a result, it is possible to reduce fluctuations of the anti-one-side pull steering angle value caused in the case where the vehicle is under cruise control and the vehicle speed is below the predetermined threshold (where fluctuations of the anti-one-side pull steering angle value are likely to occur).

Accordingly, even if the speed of the vehicle transitions to the high vehicle speed range through the low vehicle speed range when the driver is driving the vehicle straight under cruise control in the situation where the one-side pull behavior of the vehicle occurs, such as during traveling on a cant road or during traveling in a crosswind, it is possible to converge the anti-one-side pull steering angle value, which corresponds to the midpoint steering angle of the steering system for suppressing the one-side pull behavior of the vehicle, to a proper value quickly, and thereby provide steering comfort to the driver.

Note that, in an embodiment to be described later, a description is given with an example in which the anti-one-side pull controlling unit performs anti-one-side pull control when the integrated torque value exceeds the predetermined threshold.

A second aspect is characterized in that the cruise control unit performs cruise control to keep a distance from the vehicle ahead at a predetermined value.

Accordingly, the cruise control unit serves to perform cruise control to keep the distance from the vehicle ahead at the predetermined value; thus, even if the vehicle speed transitions to the high vehicle speed range through the low vehicle speed range due to the workings of this cruise control, it is possible to converge the anti-one-side pull steering angle value, which corresponds to the midpoint steering angle of the steering system for suppressing the one-side pull behavior of the vehicle, to a proper value quickly. Accordingly, it is possible to provide steering comfort to the driver.

A third aspect is characterized in that, when the vehicle speed falls below the predetermined threshold, the anti-one-side pull controlling unit keeps the anti-one-side pull steering angle value at a value obtained just before the vehicle speed falls below the predetermined threshold.

Accordingly, when the vehicle speed falls below the predetermined threshold, the anti-one-side pull controlling unit keeps the anti-one-side pull steering angle value at a value obtained just before the vehicle speed falls below the predetermined threshold; thus, it is possible to prevent fluctuations of the anti-one-side pull steering angle value. Accordingly, even if the speed of the vehicle transitions to the high vehicle speed range through the low vehicle speed range when the driver is driving the vehicle straight under cruise control in the situation where the one-side pull behavior of the vehicle occurs, such as during traveling on a cant road or during traveling in a crosswind, it is possible to converge the anti-one-side pull steering angle value, which corresponds to the midpoint steering angle of the steering system for suppressing the one-side pull behavior of the vehicle, to a proper value further quickly, and thereby provide high-level steering comfort to the driver.

Further, a fourth aspect is characterized in that, when the vehicle is under cruise control and the vehicle speed is below the predetermined threshold (e.g., 50 km per hour; corresponding to the first threshold Vth1), the anti-one-side pull controlling unit performs control to make the amount of control involved in the anti-one-side pull control smaller than the amount of control involved in the anti-one-side pull control obtained when the vehicle speed is equal to or above the predetermined threshold (first threshold Vth1).

Accordingly, when the vehicle is under cruise control and the vehicle speed is below the predetermined threshold, the anti-one-side pull controlling unit makes the amount of control involved in the anti-one-side pull control smaller than the amount of control involved in the anti-one-side pull control obtained when the vehicle speed is equal to or above the predetermined threshold; thus, it is possible to reduce and optimize the rate of operation of the anti-one-side pull control when the vehicle speed is below the predetermined threshold, i.e., when the one-side pull behavior of the vehicle is less likely to occur.

According to the embodiment, for example, even if the speed of the vehicle transitions to the high vehicle speed range through the low vehicle speed range when the driver is driving the vehicle straight under cruise control in the situation where the one-side pull behavior of the vehicle occurs, such as during traveling on a cant road or during traveling in a crosswind, it is possible to converge the anti-one-side pull steering angle value, which corresponds to the midpoint steering angle of the steering system for suppressing the one-side pull behavior of the vehicle, to a proper value quickly, and thereby provide steering comfort to the driver.

BRIEF DESCRIPTION OF THE DRAWINGS

The advantages of the disclosure will become apparent in the following description taken in conjunction with the following drawings.

FIG. 6A is a diagram illustrating the relationship between the external force applied on the vehicle on a cant road and a steering operation by a driver.

FIG. 6B is a diagram indicating that the inclination of a cant road differs lane by lane.

FIG. 7A is a flowchart simply illustrating the association between cruise control and anti-one-side pull control in the vehicle steering device according to the embodiment of the present disclosure.

FIGS. 7B(a) to 7B(d) are time charts of the anti-one-side pull control, in which: FIG. 7B(a) schematically illustrates the temporal transition of the position of a cruise control switch; FIG. 7B(b) schematically illustrates the temporal transition of the actual steering angle; FIG. 7B(c) schematically illustrates the temporal transition of the anti-one-side pull steering angle having a steering angle θ at time t2 as its initial value; and FIG. 7B(d) schematically illustrates the temporal transition of the anti-one-side pull steering angle having a steering angle of zero at time t2 as its initial value.

DETAILED DESCRIPTION

Next, an embodiment of the present disclosure is described in detail with reference to accompanying drawings.

(Overall Configuration)

Figure 1:
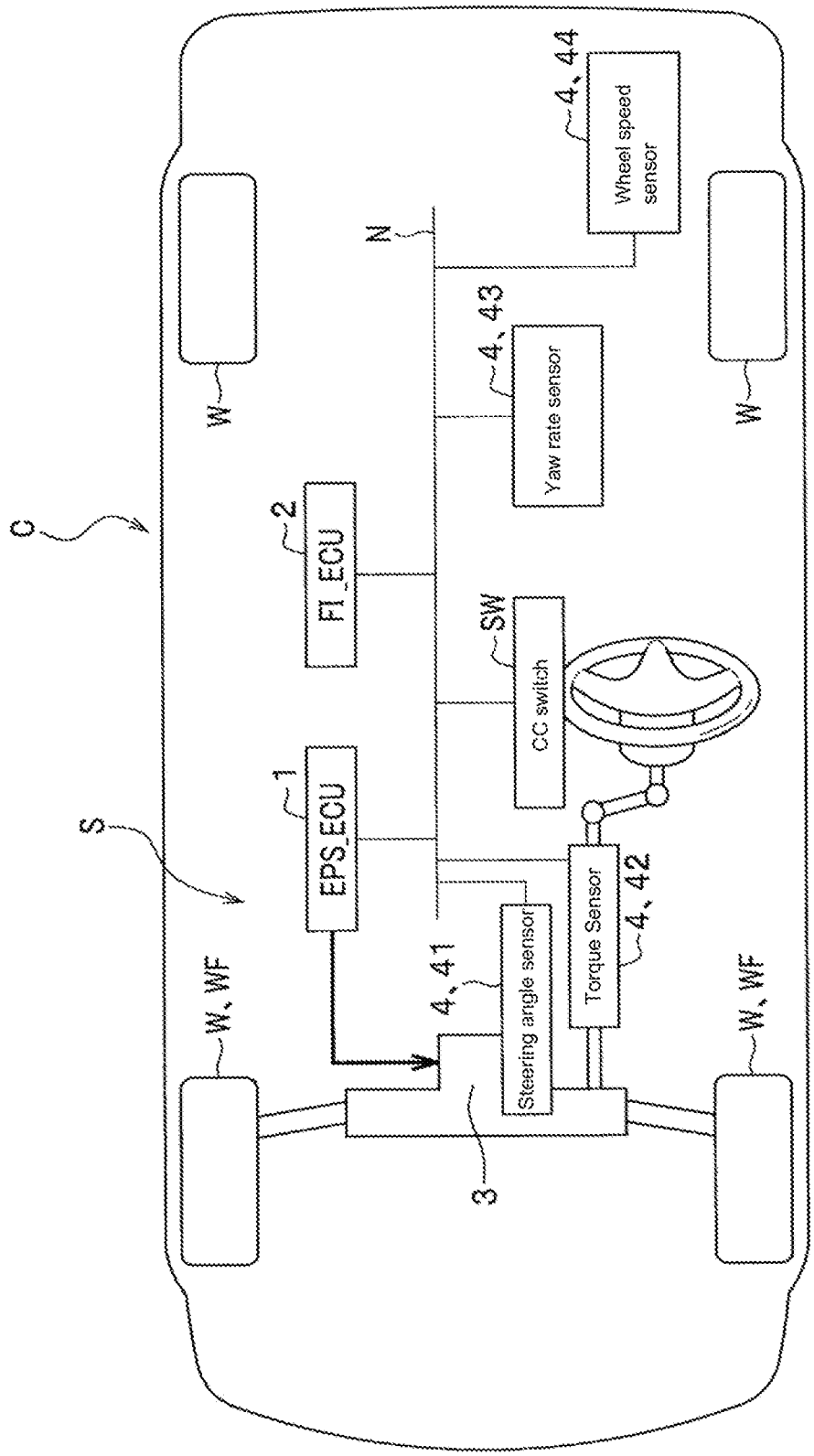
FIG. 1 is a schematic diagram illustrating the entire configuration of a vehicle equipped with a vehicle steering device according to an embodiment of the present disclosure.

FIG. 1 is a schematic diagram illustrating the entire configuration of a vehicle C equipped with a vehicle steering device S according to an embodiment of the present disclosure.

As illustrated in FIG. 1, the vehicle C is a four-wheeled vehicle that includes an internal combustion engine (not illustrated) and four wheels W. Wheels WF represent steerable wheels. The vehicle steering device S installed in the vehicle C has the configuration of an electric power steering system including: an EPS_ECU 1 that is an electronic control unit (ECU) for controlling electric power steering (EPS); and an electric motor 3 for steering. This electric power steering system is a well-known system configured to assist a driver by driving the electric motor 3 so as to relieve a steering force of the driver required for steering the wheels W. In addition, the vehicle C includes an FI_ECU 2 that is an ECU for controlling fuel injection (FI).

The EPS_ECU 1 is connected with various sensors 4 including a steering angle sensor 41, a steering torque sensor 42, a yaw rate sensor 43, and a wheel speed sensor 44, and a cruise control (CC) switch (the "cruise control switch" is hereinafter abbreviated as the "CC switch") SW.

The steering angle sensor 41 is configured to detect the steering angle of a steering system. This embodiment is described with an example where the steering angle sensor 41 is substituted with an angle sensor configured to measure the rotation angle of the electric motor 3. The steering angle sensor 41 detects, in addition to the steering angle of a steering wheel H, the rotation speed of the electric motor 3 (the electric motor rotation speed which is substantially equal to a steering speed). The steering angle sensor 41 corresponds to a "steering angle detecting unit" of the present disclosure.

The steering torque sensor (referred to as a "torque sensor" in FIG. 1) 42 is configured to detect a steering torque (manual steering force) that is input by the driver through the steering wheel H. The steering torque sensor 42 corresponds to a "steering torque detecting unit" of the present disclosure.

The yaw rate sensor 43 is configured to detect the yaw rate (turning angular velocity) of the vehicle C.

The wheel speed sensor 44 is configured to detect the rotation speed of the wheel W as a wheel speed pulse signal. The wheel speed sensor 44 is provided only for a single wheel W in FIG. 1, but is actually provided for each of the four wheels W.

A vehicle speed V of the vehicle C can be calculated, for example, by taking an average of values detected by the wheel speed sensors 44 that are respectively provided to the four wheels W, or by taking an average of values detected by the wheel speed sensors 44 that are respectively provided to two driven wheels W. The wheel speed sensor 44 corresponds to a "vehicle speed detecting unit" of the present disclosure.

The CC switch SW is a member that is turned on by the driver when the vehicle is traveling on a freeway or the like under constant speed control. In FIG. 1, the cruise control switch is denoted as the "CC switch". The CC switch SW is placed, for example, at or near the steering wheel H.

The CC switch SW is released (turned off) when a predetermined condition, such as depression of a brake pedal by the driver, is satisfied.

In FIG. 1, the EPS_ECU 1, the FI_ECU 2, the various sensors 4, the CC switch SW, and the like are connected to one another via a communication medium N such as a control area network (CAN).

Figure 2:
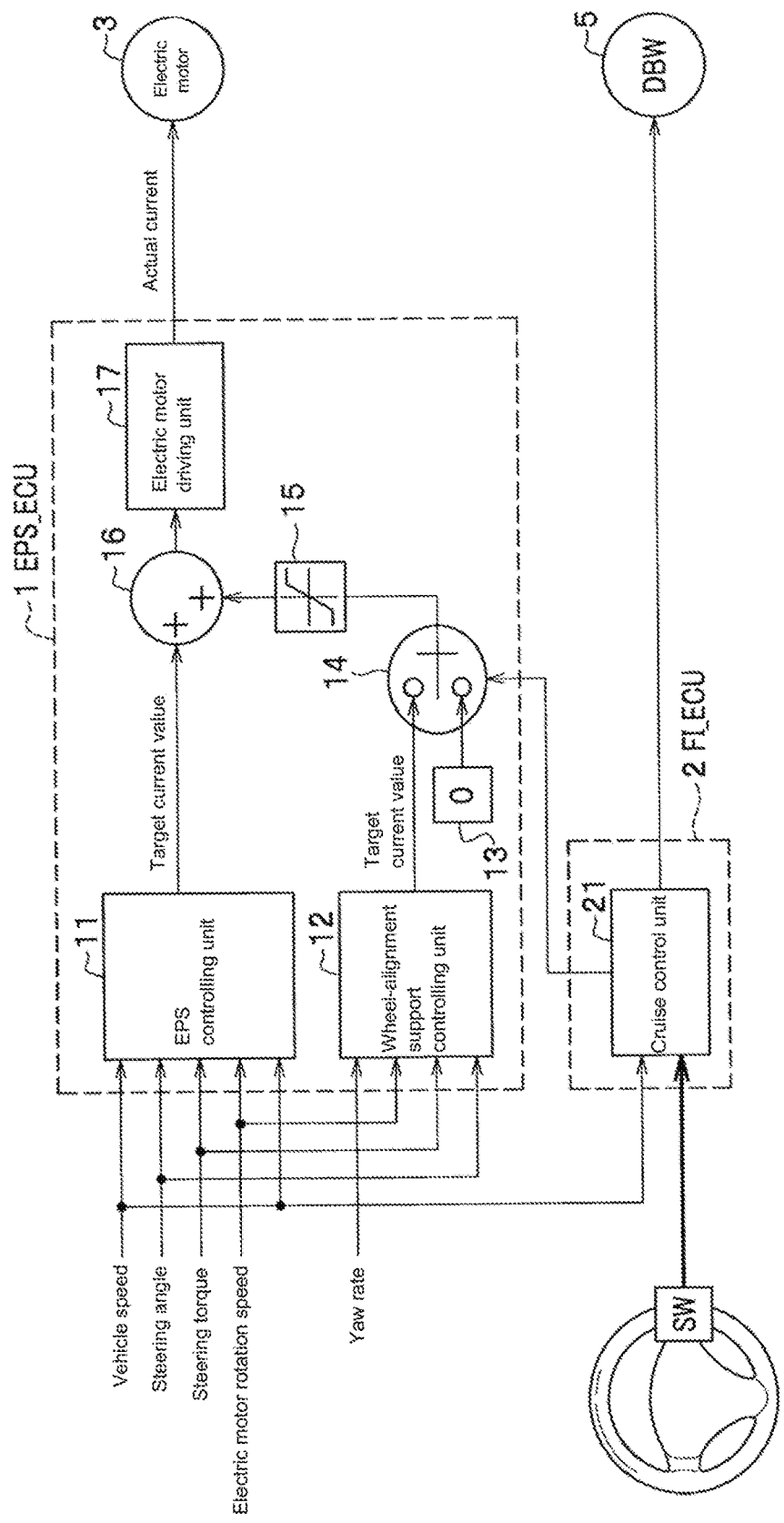
FIG. 2 is a block diagram illustrating a schematic configuration of the vehicle steering device according to the embodiment of the present disclosure.

Next, a schematic configuration of the vehicle steering device S according to the embodiment of the present disclosure is described with reference to FIG. 2. FIG. 2 is a block diagram illustrating a schematic configuration of the EPS_ECU 1 and the FI_ECU 2 in the vehicle C in FIG. 1, and an associative relationship between the two.

(EPS_ECU 1)

As illustrated in FIG. 2, the EPS_ECU 1 functions to perform driving control over the electric motor 3 for EPS. The EPS_ECU 1 has a configuration including: an EPS controlling unit 11; a wheel-alignment support controlling unit 12 that corresponds to an "anti-one-side pull controlling unit" of the present disclosure; a zero-current-value outputting unit 13; a switch 14; a limiter 15; an adder 16; and an electric motor driving unit 17.

Incidentally, in the EPS_ECU 1, the wheel-alignment support controlling unit 12, the zero-current-value outputting unit 13, the switch 14, the limiter 15, and the adder 16 are features of the embodiment according to the present disclosure. Some or all of these functions may be embodied by a processor of ECU executing computer program or may be embodied by hardware circuitry.

The EPS controlling unit 11 functions to generate a target current value (including a concept of an anti-one-side pull current value) for driving the electric motor 3, based on various parameters including the speed of the vehicle C (vehicle speed V), the steering angle of the steering wheel H, a steering torque, and the rotation speed (steering speed) of the electric motor 3.

The wheel-alignment support controlling unit 12 functions to perform, in a situation where the one-side pull behavior of the vehicle C occurs on a cant road or the like, "anti-one-side pull control" in which the target current value for canceling the one-side pull (anti-one-side-pull current value) is output to the switch 14 in the subsequent stage. The wheel-alignment support controlling unit 12 will be described in detail later with reference to FIG. 3A.

The zero-current-value outputting unit 13 functions to output the zero current value, which is to be fed to the adder 16, to the switch 14 in the subsequent stage.

The switch 14 functions to output the anti-one-side pull current value from the wheel-alignment support controlling unit 12 to the limiter 15 in the subsequent stage when the CC switch SW is on, and output the zero current value from the zero-current-value outputting unit 13 to the limiter 15 in the subsequent stage when the CC switch SW is off, based on a CC state signal (cruise control active flag) from a cruise control unit 21.

The limiter 15 functions to limit an absolute value of the current value output from the switch 14 so that the absolute value may not exceed a predetermined limit value. Specifically, when the CC switch SW is on for example, the limiter 15 limits the absolute value of the anti-one-side pull current value output from the wheel-alignment support controlling unit 12 so that the absolute value may not exceed the predetermined limit value.

Here, the limiter 15 is described in more detail. Suppose that the switch 14 and the adder 16 are connected directly without the limiter 15 in between. In this case, an output signal from the switch 14 is input to the adder 16 as it is. The output signal from the switch 14 includes an output signal of the anti-one-side pull current value from the wheel-alignment support controlling unit 12. The anti-one-side pull current value is generated in the wheel-alignment support controlling unit 12 to cancel the one-side pull. If a great one-side pull behavior occurs in the vehicle C, the anti-one-side pull current value can become an excessive value in order to cancel this great one-side pull.

If this happens, the anti-one-side pull current value being the excessive value is input to the adder 16 as it is. Then, the electric motor driving unit 17 drives the electric motor 3 based on the excessive anti-one-side pull current value output from the adder 16. This means that the EPS_ECU 1 performs anti-one-side pull control that involves movement of the midpoint (modification of an anti-one-side pull steering angle value) beyond a proper amount of movement. As a result, this causes a problem that wheel-alignment force control cannot be performed appropriately.

To deal with this, the limiter 15 is installed between the switch 14 and the adder 16, and a current limit value designed to be set by the limiter 15 is set within a range that does not exceed a maximum amount of control for the anti-one-side pull control.

With this configuration, it is possible to suppress the anti-one-side pull control that involves movement of the midpoint (modification of the anti-one-side pull steering angle value) beyond the proper amount of movement, and thereby perform the wheel-alignment force control appropriately.

The adder 16 functions to add the anti-one-side pull current value output from the limiter 15 to the target current value output from the EPS controlling unit 11. Specifically, the adder 16 functions to add, if the CC switch SW is on, the anti-one-side pull current value output from the wheel-alignment support controlling unit 12 to the target current value output from the EPS controlling unit 11, and output the resultant value to the electric motor driving unit 17.

The electric motor driving unit 17 includes a processing unit and an inverter (not illustrated). The electric motor driving unit 17 functions to generate a pulse width modulation (PWM) signal based on the target current value having been subjected to addition processing and output from the adder 16, drive the inverter using this PWM signal to generate a three-phase alternating current to be fed to the electric motor 3, and thereby drive the electric motor 3 in PWM.

(FI_ECU)

As illustrated in FIG. 2, the FI_ECU 2 is an ECU that takes charge of control over ignition timing, the amount of fuel injection, and the like. The FI_ECU 2 installed in the vehicle C includes the cruise control unit 21. The cruise control unit 21 of the FI_ECU 2 functions to perform cruise (constant speed travel) control on the vehicle C at the vehicle speed V that is set appropriately, by adjusting the opening of a drive-by-wire (DBW) valve 5. In addition, the cruise control unit 21 functions to output a signal (cruise control active flag) to the switch 14 when the CC switch SW placed on the steering wheel H is on, and thus cause the switch to output the anti-one-side pull current value output from the wheel-alignment support controlling unit 12 to the limiter 15 in the subsequent stage.

Further, when the CC switch SW is turned on, the cruise control unit 21 controls the output of the engine through the drive-by-wire (DBW) valve 5 to cause the vehicle C to cruise (travel at a constant speed). This cruise control function allows the vehicle C to cruise without any acceleration work by the driver (with his/her foot off the acceleration pedal) in a long straight road with no signal, for example.

In this respect, as the cruise control performed by the cruise control unit 21, it is also possible to employ adaptive cruise control (ACC) that performs control to keep a distance from the vehicle ahead at a predetermined value (which may be a constant value, or may be a value varying with the vehicle speed V) by automating braking control in addition to acceleration/deceleration control. Some or all of these functions may be embodied by a processor of ECU executing computer program or may be embodied by hardware circuitry.

The cruise control unit 21 and the switch 14 are associated in the following way. Specifically, if the CC switch SW is on, the cruise control unit deems that the anti-one-side pull control (wheel-alignment support control) is highly likely to be performed, and thus switches the switch 14 to the wheel-alignment support controlling unit 12 side to enable the anti-one-side pull control.

On the other hand, if the CC switch SW is off, the cruise control unit deems that there is no large steering operation and the anti-one-side pull control is less likely to hinder the comfort of the driver, and thus switches the switch 14 to the zero-current-value outputting unit 13 side to disable the anti-one-side pull control.

(Wheel-Alignment Support Controlling Unit)

Figure 3A:
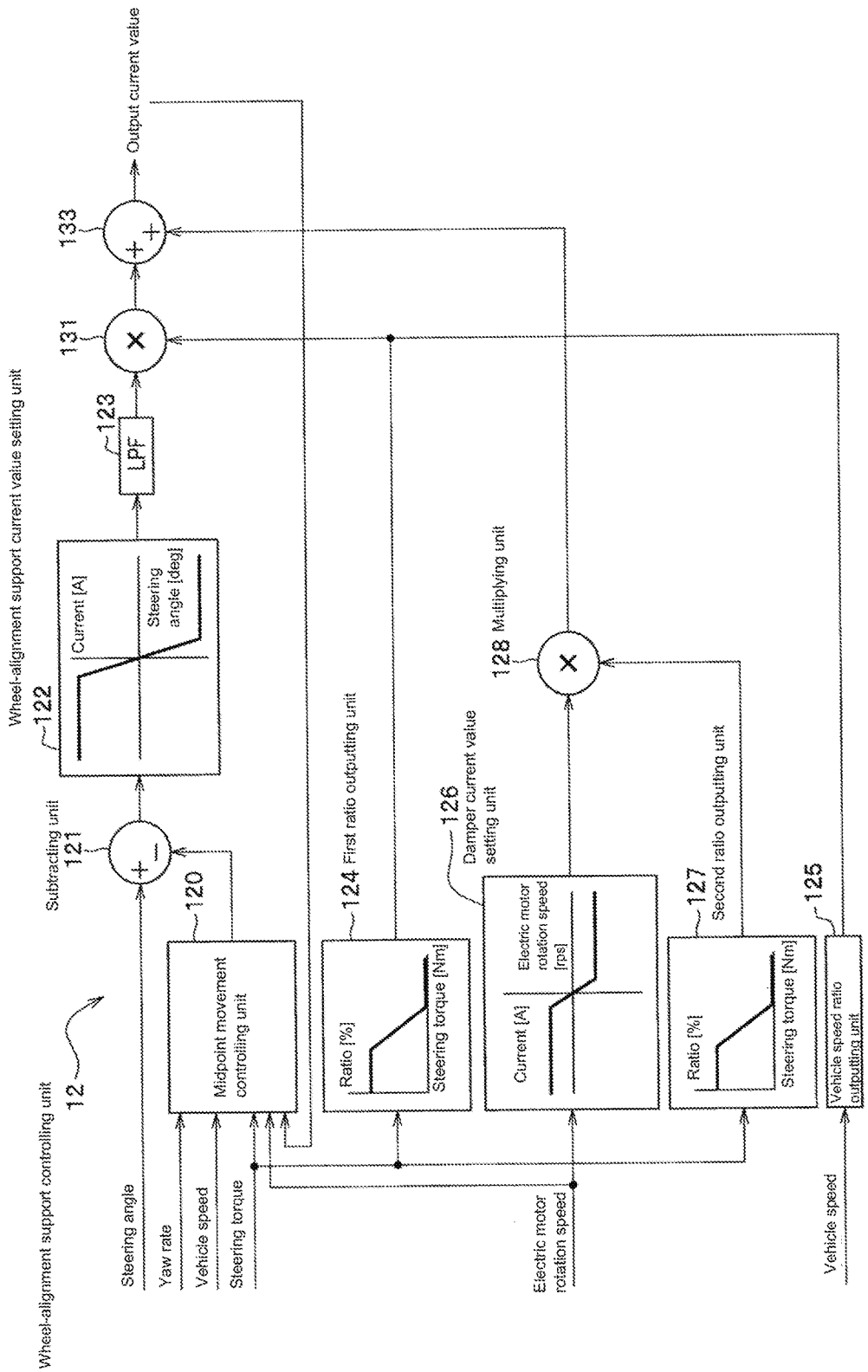
FIG. 3A is a block diagram illustrating an internal configuration of a wheel-alignment support controlling unit illustrated in FIG. 2.
Figure 3B:
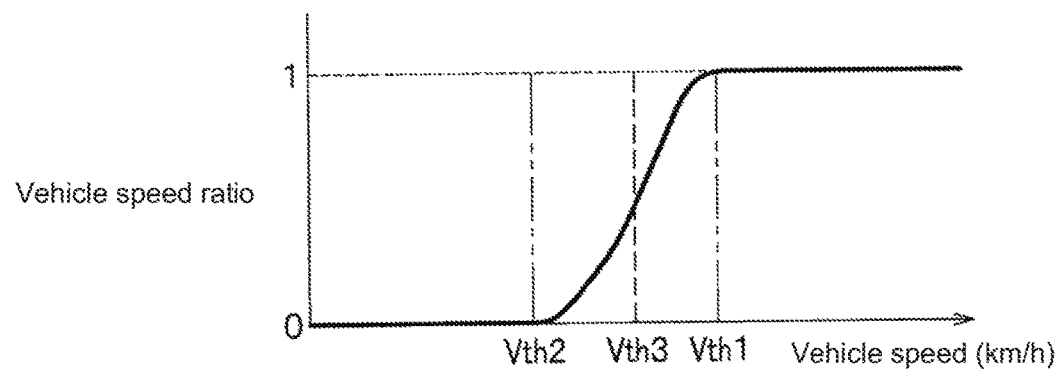
FIG. 3B is an explanatory diagram illustrating an example of vehicle speed ratio characteristics that are variable with the vehicle speed.

Next, an internal configuration of the wheel-alignment support controlling unit 12 is described with reference to FIGS. 3A and 3B. FIG. 3A is a block diagram illustrating the internal configuration of the wheel-alignment support controlling unit illustrated in FIG. 2. FIG. 3B is an explanatory diagram illustrating an example of vehicle speed ratio characteristics that are variable with the vehicle speed V.

As illustrated in FIG. 3A, the wheel-alignment support controlling unit 12 includes: a midpoint movement controlling unit 120; a subtracting unit 121; a wheel-alignment support current value setting unit 122; a low-pass filter (LPF) 123; a first ratio outputting unit 124; a multiplying unit 131; a damper current value setting unit 126; a second ratio outputting unit 127; a multiplying unit 128; an adding unit 133; and the like.

The wheel-alignment support controlling unit 12 according to this embodiment functions to output the target current value (base current value for anti-one-side pull) so as to suppress the movement of the electric motor 3 against a disturbance (external force), such as a cant road or a crosswind, that causes a one-side pull behavior of the vehicle C.

The midpoint movement controlling unit 120 functions to receive input of a yaw rate, a steering torque, and an output current value from the wheel-alignment support controlling unit 12 and, when the integrated value of the steering torque (integrated torque value) exceeds a threshold (midpoint movement judgment threshold) for example, output the amount of movement (amount of displacement) of the anti-one-side pull steering angle value which corresponds to the midpoint steering angle of the steering system for suppressing the one-side pull behavior of the vehicle C. The midpoint movement controlling unit 120 will be described in detail later with reference to FIG. 4A.

Incidentally, the initial value of the anti-one-side pull steering angle value is set to 0 degree which corresponds to the neutral position of the steering system, for example. When the steering angle of the steering wheel H is below a predetermined steering angle threshold or when the yaw rate is below a predetermined yaw rate threshold, for example, the initial value of the anti-one-side pull steering angle value may be set to the steering angle of the steering wheel H at that time. Meanwhile, when the steering angle of the steering wheel H is equal to or above the predetermined threshold or when the yaw rate is equal to or above the predetermined yaw rate threshold, the initial value of the anti-one-side pull steering angle value may be set to 0 degree. Specifically, the magnitude of the initial value of the anti-one-side pull steering angle value may be set as appropriate based on an analysis result obtained through experiments and simulations, for example.

The subtracting unit 121 functions to subtract the amount of movement (amount of displacement) of the anti-one-side pull steering angle value, output from the midpoint movement controlling unit 120, from the initial value of the anti-one-side pull steering angle value (0 degree which corresponds to the neutral position of the steering system, or the current steering angle of the steering wheel H input from the steering angle sensor 41) as a reference value.

The wheel-alignment support current value setting unit 122 functions to convert the amount of movement of the anti-one-side pull steering angle value, input from the subtracting unit 121, to an anti-one-side pull current value (base current value) based on mapping information (steering angle-current characteristics) in which the amount of movement (amount of displacement) of the anti-one-side pull steering angle value and the anti-one-side pull current value corresponding to this amount are associated with each other. In this respect, the mapping information (steering angle-current characteristics) is set to have such characteristics that the absolute value of the base current value increases as the absolute value of the steering angle increases. This is because, as the one-side pull tendency increases, the driver attempts to align the steering wheel by increasing the steering angle in order to cancel this tendency. The wheel-alignment support current value setting unit 122 corresponds to a "mapping information storing unit" of the present disclosure.

Additionally, the mapping information (steering angle-current characteristics) is set to have such steering angle-current characteristics that the motion of the electric motor 3 is suppressed against a disturbance (external force) that is supposed to cause a one-side pull behavior of the vehicle C. This is because the suppression of the motion of the electric motor 3 leads to suppression of the movement of the steering wheel H, which reduces a physical burden for the driver to align the steering wheel H.

In a graph illustrated in the wheel-alignment support current value setting unit 122 in FIG. 3A, steering angles rightward from the center of the horizontal axis are indicated by positive values, whereas steering angles leftward therefrom are indicated by negative values. For example, when the steering angle has a positive value, the base current value is set to a negative value. On the other hand, when the steering angle has a negative value, the base current value is set to a positive value.

Note that the mapping information (steering angle-current characteristics) set in the wheel-alignment support current value setting unit 122 is set to have such characteristics that the base current value is either raised or dropped with the initial value (0 degree in the example of FIG. 3A) of the anti-one-side pull steering angle value as their borderline. By setting such characteristics in the mapping information (steering angle-current characteristics), it is possible to provide a sense of returning to a reference position at steering angles of the steering wheel H near the initial value of the anti-one-side pull steering angle value. In the following description, the steering angle of the steering wheel H that works as a reference when the vehicle C travels straight will be referred to as a "midpoint steering angle of the steering system". Although described in detail later, this midpoint steering angle of the steering system (midpoint) varies with driving environment of the vehicle C (a flat straight road or a cant road).

Note that, in the EPS controlling unit 11, a concept of the base current value and the damper current value also exists as in the case of the wheel-alignment support controlling unit 12. However, while the base current value and the damper current value in the wheel-alignment support controlling unit 12 belong to a concept used to perform the anti-one-side pull control for the wheel-alignment support, the base current value and the damper current value in the EPS controlling unit 11 belong to a concept used to perform the torque assist control on the steering. Thus, it should be further noted that the base current value and the damper current value in the wheel-alignment support controlling unit 12 and those in the EPS controlling unit 11 are different from each other in terms of concept.

The low-pass filter 123 functions to damp the temporal transition characteristics of the base current value, output from the wheel-alignment support current value setting unit 122, by performing a temporal moving-average process on the base current value. However, the low-pass filter 123 can be omitted by appropriately adjusting the mapping information (steering angle-current characteristics) set in the wheel-alignment support current value setting unit 122.

Here, the low-pass filter 123 is described in more detail. Suppose that the low-pass filter 123 is placed in a prior stage of the wheel-alignment support current value setting unit 122. In this case, the steering angle signal detected by the steering angle sensor 41 is input to the low-pass filter 123. In this event, a cutoff frequency of the low-pass filter 123 is generally set to a relatively low frequency. This is because the reliability of the control can be enhanced by reducing (including removing and attenuating) high-frequency noises contained in the steering angle signal.

However, the following problem occurs if the cutoff frequency of the low-pass filter 123 is set relatively low as described above. Specifically, the temporal characteristics of the steering angle signal sometimes change drastically due to quick steering by the driver during travel on a winding road or during a lane change. At this time, if the cutoff frequency of the low-pass filter 123 is set relatively low, the response of the detection signal to the drastic change of the steering angle is so poor that the response of the anti-one-side pull control to the drastic change of the steering angle is impaired.

Alternatively, if the cutoff frequency of the low-pass filter 123 is set relatively high in contrast to the above, then high frequency noises contained in the steering angle signal are removed so insufficiently that the reliability of the anti-one-side pull control is impaired in such a way that the anti-one-side pull control is performed even in scenes in which no control is originally needed, including during straight travel on a flat road.

To cope with this, the low-pass filter 123 is placed in the subsequent stage of the wheel-alignment support current value setting unit 122, and the cutoff frequency of the low-pass filter 123 is set relatively high.

With this configuration, it is possible to achieve high reliability and quick response of the anti-one-side pull control at the same time, and also possible to enhance the freedom in setting the cutoff frequency of the low-pass filter 123.

The first ratio outputting unit 124 functions to convert the steering torque, input from the steering torque sensor 42, to a first ratio based on mapping information (set in advance) associating the first ratio with a change in the steering torque. Here, the first ratio is a modification coefficient for appropriately modifying the base current value, output from the low-pass filter 123, in consideration of the magnitude of the steering torque.

The mapping information associating the first ratio with the change in the steering torque is set to have such characteristics that the first ratio takes a substantially constant positive value in a range where the steering torque takes predetermined small values, takes a smaller value as the value of the steering torque becomes large beyond that small range, and takes a value of zero in a range where the steering torque takes predetermined large values. This is because, when the driver steers the vehicle C for a right or left turn, a lane change, or obstacle bypassing (the value of the steering torque belongs to that large range), modifying the anti-one-side pull current value to a smaller value is considered to be preferable from the viewpoint of not disturbing the steering by the driver.

A vehicle speed ratio outputting unit 125 functions to convert the vehicle speed V, acquired by the wheel speed sensor 44 based on a wheel speed, to a vehicle speed ratio based on mapping information (set in advance) associating the vehicle speed ratio with a change in the vehicle speed V. Here, the vehicle speed ratio is a modification coefficient for appropriately modifying the base current value (the amount of control involved in the anti-one-side pull control) output from the low-pass filter 123, in consideration of the vehicle speed V.

As illustrated in FIG. 3B, the mapping information associating the vehicle speed ratio with the change in the vehicle speed is set to have such characteristics that the vehicle speed ratio takes a constant positive value (1) in a middle vehicle speed range where the vehicle speed V exceeds a first threshold Vth1 (50 km per hour, for example), takes a value reduced gradually from 1 to 0 in a vehicle speed range where the vehicle speed V falls between the first threshold Vth1 and a second threshold Vth2 (30 km per hour, for example), and takes a constant value (0) in a vehicle speed range where the vehicle speed V is below the second threshold Vth2. This is because, since the amount of correction of the steering and the number of this correction tends to be large in a low vehicle speed range where the vehicle speed V is equal to or below the first threshold Vth1, modifying the anti-one-side pull current value to a smaller value is considered to be preferable from the viewpoint of suppressing movement of the midpoint to an improper steering angle value (fluctuations of the anti-one-side pull steering angle value).

The multiplying unit 131 functions to modify the base current value (anti-one-side pull steering angle value), having been subjected to a high-frequency component removing process by the low-pass filter 123, in consideration of the magnitude of the steering torque and the level of the vehicle speed V by multiplying the base current value by the first ratio output from the first ratio outputting unit 124 and the vehicle speed ratio output from the vehicle speed ratio outputting unit 125.

The damper current value setting unit 126 functions to convert the input rotation speed of the electric motor to the damper current value based on mapping information (set in advance) associating the damper current value with a change in the rotation speed of the electric motor. Here, the damper current value is a modification coefficient for appropriately modifying the base current value, used to drive the electric motor 3, in consideration of the level of the rotation speed of the electric motor.

The mapping information associating the damper current value with the change in the rotation speed of the electric motor is set to have such characteristics that the current value linearly increases or decreases when the rotation speed of the electric motor stays within a low speed range including zero, and takes a substantially constant current value in each rotation direction once the rotation speed of the electric motor falls outside the low speed range. This is because, by feeding the electric motor 3 with a current having characteristics of suppressing the rapid motion of the electric motor 3 as its motion becomes more rapid, the rapid motion of the electric motor 3 is suppressed, and thus the stability in aligning the steering wheel H is increased. In this respect, the information on the rotation speed of the electric motor may be acquired from a rotation speed sensor, such as a resolver, installed in the electric motor 3, or alternatively may be obtained based on a time-differentiated value of the steering angle from the steering angle sensor 41.

Here, the damper current value set by the damper current value setting unit 126 and the damper current value set by the EPS controlling unit 11 are different in the following point. Specifically, the damper current value set by the EPS controlling unit 11 is intended to prevent the fluctuation of the steering wheel H when the vehicle C is traveling at a high speed and thus to give the driver a feeling of stable steering. On the other hand, the damper current value set by the damper current value setting unit 126 is intended to suppress the one-side pull behavior.

The second ratio outputting unit 127 functions to convert the steering torque, input from the steering torque sensor 42, to a second ratio based on mapping information (set in advance) associating the second ratio with a change in the steering torque. Here, the second ratio is a modification coefficient for appropriately modifying the damper current value, output from the damper current value setting unit 126, in consideration of the magnitude of the steering torque.

The mapping information associating the second ratio with the change in the steering torque is set to have such characteristics that, as in the case of the mapping information associating the first ratio with the change in the steering torque, the second ratio takes a substantially constant positive value in a range where the steering torque takes predetermined small values, takes a smaller value as the value of the steering torque becomes large beyond that small range, and takes a value of zero in a range where the steering torque takes predetermined large values. This is because, when the driver steers the vehicle C for a right or left turn, a lane change, or obstacle bypassing (the value of the steering torque belongs to that large range), modifying the damper current value to a smaller value is considered to be preferable from the viewpoint of not disturbing the steering by the driver.

The multiplying unit 128 functions to modify the damper current value, output from the damper current value setting unit 126, in consideration of the magnitude of the steering torque by multiplying the damper current value by the second ratio output from the second ratio outputting unit 127.

The adding unit 133 functions to modify the base current value, output from the multiplying unit 131, in consideration of the magnitude of the damper current value by adding the damper current value, output from the multiplying unit 128, to the base current value. The adding unit 133 outputs the modified base current value as the anti-one-side pull current value.

In this embodiment, as illustrated in FIG. 2, when the status is on indicating that the cruise control by the cruise control unit 21 of the FI_ECU 2 is active, the anti-one-side pull current value is added in the adder 16 to the target current value (target current value in the EPS control) output from the EPS controlling unit 11. The electric motor driving unit 17 drives the electric motor 3 so that a current is fed from a battery power source (not illustrated) in accordance with the target current value subjected to the addition process above.

(Midpoint Movement Controlling Unit)

Figure 4A:
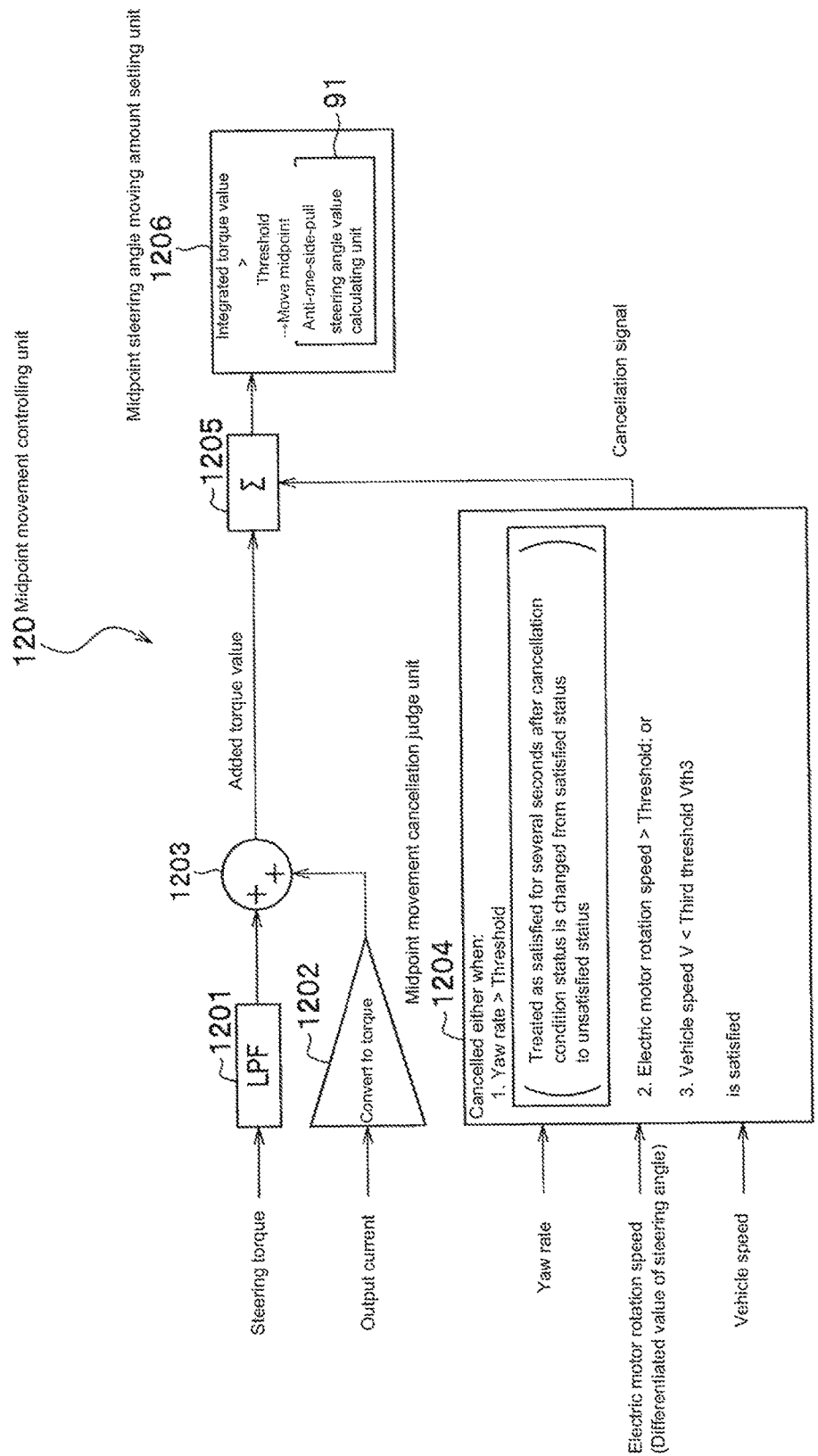
FIG. 4A is a block diagram illustrating an internal configuration of a midpoint movement controlling unit illustrated in FIG. 3A.
Figure 4B:
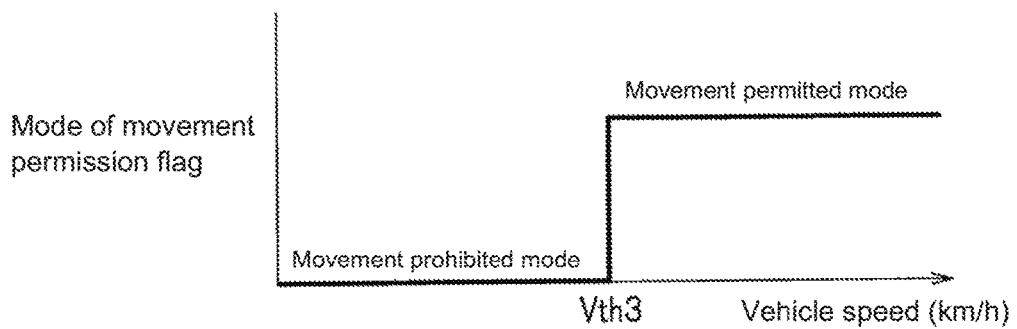
FIG. 4B is a diagram illustrating midpoint movement permitted and prohibited modes that are inverted depending on the level of the vehicle speed.

Next, an internal configuration of the midpoint movement controlling unit 120 is described with reference to FIGS. 4A and 4B. FIG. 4A is a block diagram illustrating the internal configuration of the midpoint movement controlling unit 120. FIG. 4B is a diagram illustrating midpoint movement permitted and prohibited modes that are inverted depending on the level of the vehicle speed V.

As illustrated in FIG. 4A, the midpoint movement controlling unit 120 includes: a low-pass filter (LPF) 1201; a torque converting unit 1202; an added torque calculating unit 1203; a midpoint movement cancellation judging unit 1204; an integrating unit 1205; a midpoint steering angle moving amount setting unit 1206; and the like.

The low-pass filter 1201 functions to remove high-frequency components in the steering torque signal, output from the steering torque sensor 42 successively, and output the steering torque signal subjected to the removal process and mainly composed of low-frequency components to the added torque calculating unit 1203 in the subsequent stage. The low-pass filter 1201 removes the high-frequency components in the steering torque signal due to road surface irregularities, and outputs, to the added torque calculating unit 1203 in the subsequent stage, only the steering torque signal mainly composed of the low-frequency components at the time of aligning the steering wheel on a cant road.

The torque converting unit 1202 receives a feedback input of the base current value (input current value to the electric motor 3) output from the wheel-alignment support controlling unit 12, convert the base current value to the steering torque by multiplying the base current value by a predetermined conversion coefficient, and output the steering torque obtained by the conversion to the added torque calculating unit 1203 in the subsequent stage.

The added torque calculating unit 1203 functions to calculate an added torque by adding the torque, output from the torque converting unit 1202 and obtained by converting the base current value output from the wheel-alignment support controlling unit 12, to the steering torque output from the low-pass filter 1201, and output the added torque thus calculated to the integrating unit 1205 in the subsequent stage. The added torque calculating unit 1203 serves to increase the integrated torque value promptly to enable quick movement of the midpoint steering angle (midpoint) of the steering wheel H (correction of the anti-one-side pull steering angle value). In this respect, by performing the anti-one-side pull control involving the movement of the midpoint of the steering system, the steering torque for canceling the one-side pull behavior decreases gradually along with the operation of the electric motor 3. As a result, the added torque gradually converges to zero.

The midpoint movement cancellation judging unit 1204 functions to generate a cancellation signal for canceling the movement of the midpoint (movement permission flag: movement prohibited mode, see FIG. 4B) based on the assumption that a cancellation condition for canceling the movement of the midpoint is satisfied, when either one of the conditions including: that the yaw rate detected by the yaw rate sensor 43 exceeds a predetermined threshold; that the rotation speed of the electric motor (steering angular velocity: time-differentiated value of the steering angle) exceeds a predetermined threshold; and that the vehicle speed V is below a third threshold Vth3 (40 km per hour, for example) (see FIG. 4B) is satisfied, and output the cancellation signal to the integrating unit 1205 in the subsequent stage.

More specifically, during a transition period of the vehicle C from the turning state to the straight travel state, after the yaw rate becomes equal to or below the predetermined threshold, the midpoint movement cancellation judging unit 1204 operates to keep outputting the cancellation signal (movement permission flag: movement prohibited mode) to the integrating unit 1205 in the same way as when the vehicle is turning (when the yaw rate exceeds the predetermined threshold) until a predetermined standby time (changeable as appropriate: e.g., several seconds) elapses. Thereby, during the transition period, the midpoint movement cancellation judging unit 1204 keeps resetting the integrated torque value to zero (avoiding a situation where the integrated torque value exceeds the midpoint movement judgment threshold) to disable the movement of the midpoint (correction of the anti-one-side pull steering angle value).

In other words, in a situation where the midpoint movement cancellation judging unit 1204 is outputting the cancellation signal (movement permission flag: movement prohibited mode) due to the satisfaction of the cancellation condition, even if the cancellation condition becomes unsatisfied, the midpoint movement cancellation judging unit 1204 does not stop outputting the cancellation signal immediately, and instead operates to keep outputting the cancellation signal until the predetermined standby time elapses based on the assumption that the cancellation condition is satisfied.

The reason is as follows. Specifically, during the transition period, the value of the steering torque detected by the steering torque sensor 42 tends to fluctuate under the influence of the posture change of the vehicle C and have an error. Then, the integrated value of the added torque (integrated torque value) in the integrating unit 1205 also tends to have an error. This may impair the validity of the midpoint movement timing, and may impair steering comfort for the driver. More specifically, when the vehicle C is traveling on a cant road, for example, the driver operates the steering wheel H to bring the steering angle in line with the inclination of the cant road; however, if the anti-one-side pull control is turned on before this operation, the driver might feel a sense of discomfort in the steering.

The midpoint movement cancellation judging unit 1204 judges whether or not the vehicle C is traveling straight according to the judgment whether the yaw rate exceeds the predetermined threshold or whether the rotation speed of the electric motor exceeds the predetermined threshold. This is because the phenomenon that the yaw rate is equal to or below the predetermined threshold or the phenomenon that the rotation speed of the electric motor is equal to or below the predetermined threshold appears when the vehicle C is traveling straight.

In addition, the midpoint movement cancellation judging unit 1204 judges whether or not movement of the midpoint to an improper steering angle value (fluctuations of the anti-one-side pull steering angle value) is likely to occur according to the judgment whether or not the vehicle speed V is below the third threshold Vth3. This is because, when the vehicle speed V enters a low vehicle speed range, e.g. below the third threshold Vth3, the amount of correction of the steering and the number of this correction becomes large, and thus the anti-one-side pull steering angle value is likely to fluctuate.

In short, when the vehicle C is not traveling straight or when the anti-one-side pull steering angle value is likely to fluctuate, the midpoint movement cancellation judging unit 1204 operates to generate a cancellation signal (movement permission flag: movement prohibited mode) for canceling the movement of the midpoint based on the assumption that the movement of the midpoint (correction of the anti-one-side pull steering angle value) by the anti-one-side pull control should not be permitted.

The integrating unit 1205 functions to add up the added torque, output from the added torque calculating unit 1203 successively, at a predetermined sampling rate to obtain the integrated torque value, and output the integrated torque value thus obtained to the midpoint steering angle moving amount setting unit 1206 in the subsequent stage. In addition, the integrating unit 1205 functions to reset the integrated torque value to zero upon input of the cancellation signal (movement permission flag: movement prohibited mode) from the midpoint movement cancellation judging unit 1204.

For example, if the movement of the midpoint is canceled because the vehicle C is turning (the yaw rate exceeds the predetermined threshold), the movement of the midpoint is canceled in a state where the anti-one-side pull steering angle value just before the turning is kept. As a result, while the vehicle C is turning, the base current value according to the anti-one-side pull steering angle value just before the turning is kept output to the electric motor 3.

Specifically, if the vehicle C starts turning when the anti-one-side pull steering angle value takes a certain value (e.g. 3 degree), for example, the vehicle turns with this certain value (3 degree) kept. While the vehicle C is turning, the anti-one-side pull steering angle value remains not updated. Then, when the turning of the vehicle C is over, the movement of the midpoint (correction of the anti-one-side pull steering angle value) is permitted after the predetermined standby time elapses since the time at which the turning is over.

In addition, if the movement of the midpoint is canceled because the vehicle speed V falls below the third threshold Vth3, for example, the movement of the midpoint is canceled in a state where the anti-one-side pull steering angle value obtained just before the vehicle speed V falls below the third threshold Vth3 is kept. As a result, while the vehicle speed V is below the third threshold Vth3, the base current value according to this obtained anti-one-side pull steering angle value is kept output to the electric motor 3.

Specifically, if the vehicle speed V falls below the third threshold Vth3 when the anti-one-side pull steering angle value takes a certain value (e.g. 3 degree), for example, cruise control is performed with this certain value (3 degree) kept. During the cruise control on the vehicle C, the anti-one-side pull steering angle value remains not updated. Then, when the vehicle speed V exceeds the third threshold Vth3, the movement of the midpoint (correction of the anti-one-side pull steering angle value) is permitted after the predetermined standby time elapses since the time at which the vehicle speed exceeds the threshold.

The anti-one-side pull steering angle value is reset to its initial value (zero representing the neutral position) when an ignition switch is turned on or off, when the vehicle steering device S according to the embodiment of the present disclosure is turned on or off, and when the CC switch SW is turned on or off. Since the anti-one-side pull control is activated or deactivated (travel environment often changes) at these timings, the anti-one-side pull steering angle value is reset to its initial value instead of being kept at the value obtained last.

As illustrated in FIG. 4A, the midpoint steering angle moving amount setting unit 1206 includes an anti-one-side pull steering angle value calculating unit 91. The midpoint steering angle moving amount setting unit 1206 is configured to judge whether or not the integrated torque value, output from the integrating unit 1205 successively, exceeds a predetermined midpoint movement judgment threshold. Here, the integrated torque value has a possibility of exceeding the midpoint movement judgment threshold only when all of three conditions that the yaw rate is equal to or below the predetermined threshold, that the rotation speed of the electric motor is equal to or below the predetermined threshold, and that the vehicle speed V is equal to or above the third threshold Vth3 are satisfied. This is because the integrated torque value which does not satisfy any of these three conditions is reset to zero.

The anti-one-side pull steering angle value calculating unit 91 is configured to calculate, when the integrated torque value exceeds the midpoint movement judgment threshold, the amount of movement (amount of displacement) of the anti-one-side pull steering angle value corresponding to the integrated torque value based on mapping information (integrated torque value-anti-one-side pull steering angle value) in which the integrated torque value and the amount of movement of the anti-one-side pull steering angle value corresponding to a change in this integrated torque value are associated with each other.

In this respect, for setting the mapping information (integrated torque value-anti-one-side pull steering angle value), proper characteristics obtained through experiments and simulations using an actual vehicle may be set as appropriate so as to execute proper anti-one-side pull control.

The midpoint steering angle moving amount setting unit 1206 outputs, to the subtracting unit 121 (see FIG. 3A), a control signal on the amount of movement (amount of displacement) of the anti-one-side pull steering angle value, calculated by the anti-one-side pull steering angle value calculating unit 91, as an output from the midpoint movement controlling unit 120.

In this respect, except the timings at which the anti-one-side pull steering angle value is reset to its initial value, the midpoint steering angle moving amount setting unit 1206 updates and stores the anti-one-side pull steering angle value (the value after movement by the predetermined amount of movement), calculated by the anti-one-side pull steering angle value calculating unit 91, every time this value is calculated.

In this manner, the midpoint movement controlling unit 120 adds a torque, converted from the current value output from the wheel-alignment support controlling unit 12, to the steering torque signal in which high-frequency components are cut down and, based on the integrated torque value obtained by temporally adding up this added torque value and the mapping information (integrated torque value-anti-one-side pull steering angle value), sets the amount of movement (amount of displacement) of the anti-one-side pull steering angle value corresponding to this integrated torque value. This makes the conditions of moving the midpoint steering angle easily satisfied, thereby making it possible to quickly respond to the one-side pull behavior.

(Operation of Vehicle Steering Device S According to Embodiment of Present Disclosure)

Next, an operation of the vehicle steering device S according to the embodiment of the present disclosure is described specifically with reference to the drawings.

Figure 5A:
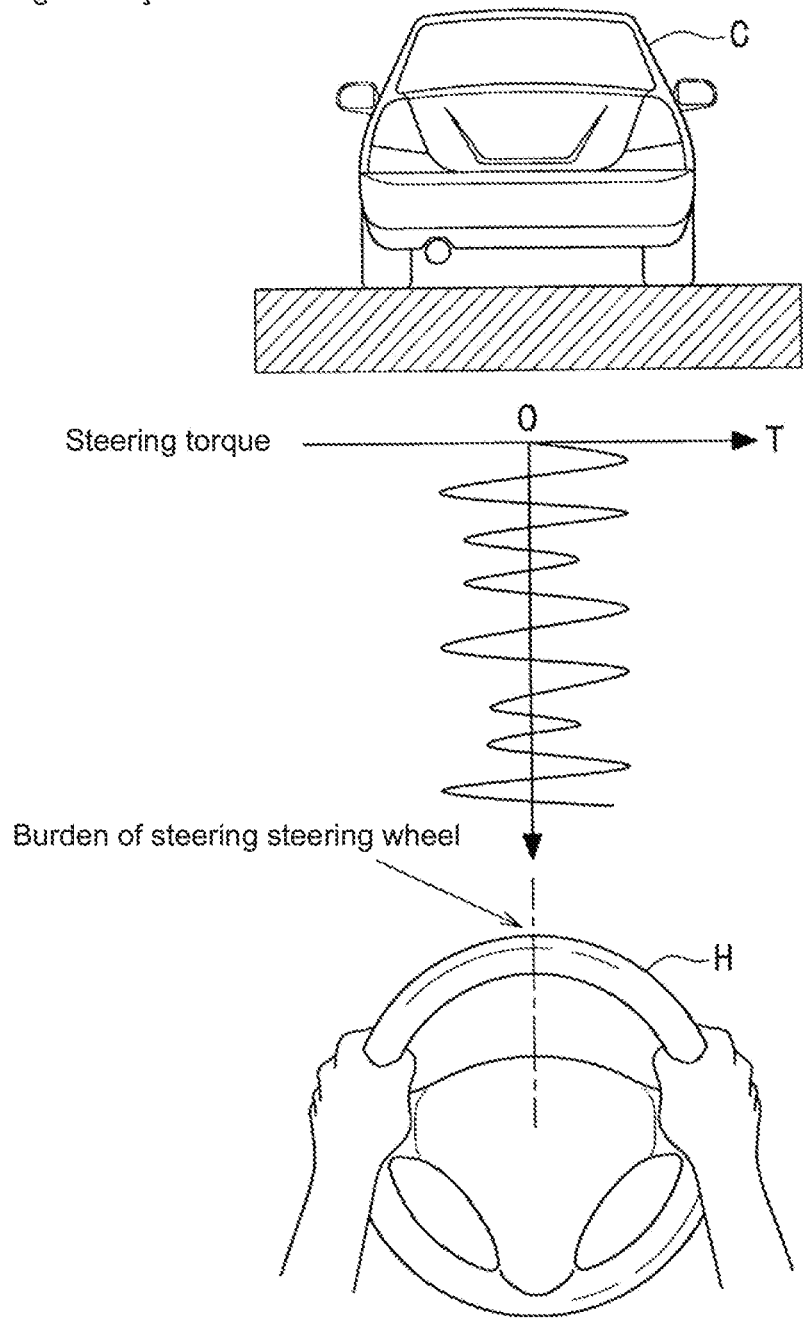
FIG. 5A is an explanatory diagram illustrating the relationship between the inclination of a vehicle body and the steering torque observed when a vehicle is traveling on a flat straight road.
Figure 5B:
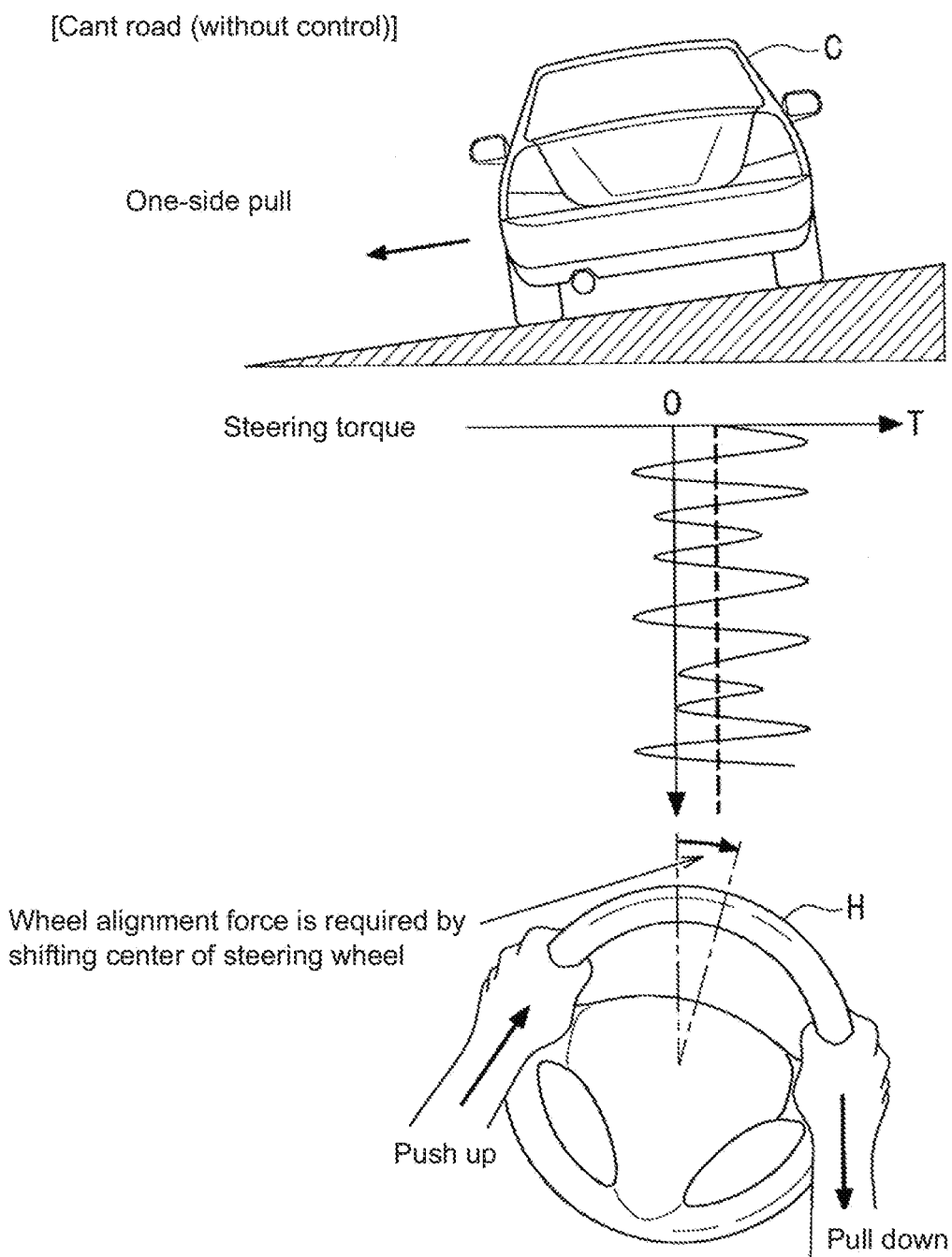
FIG. 5B is an explanatory diagram illustrating the relationship between the inclination of the vehicle body and the steering torque observed when the vehicle is traveling on a cant road without anti-one-side pull control.
Figure 5C:
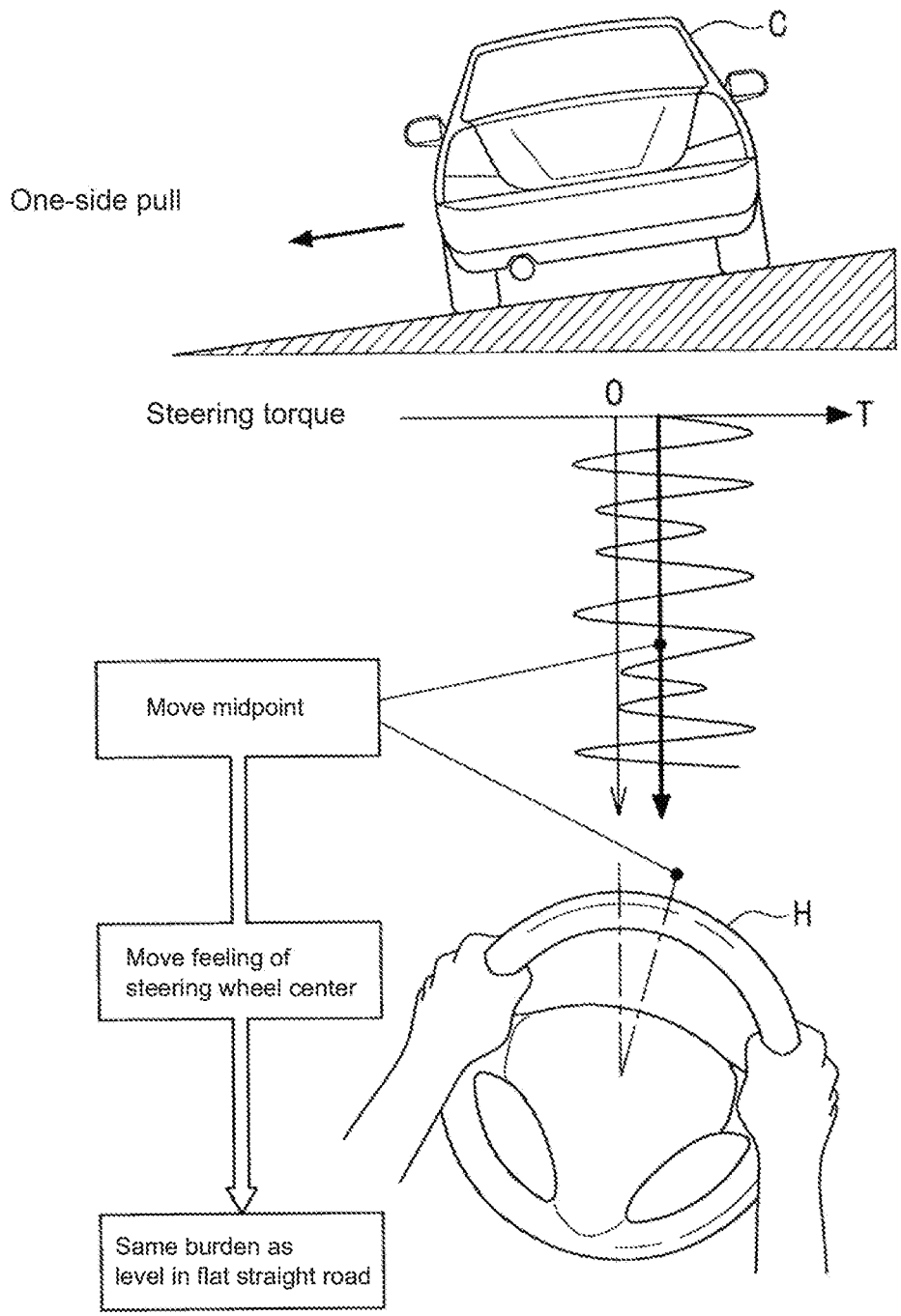
FIG. 5C is an explanatory diagram illustrating the relationship between the inclination of the vehicle body and the steering torque observed when the vehicle is traveling on a cant road with anti-one-side pull control.

FIGS. 5A to 5C are diagrams illustrating the relationship among the inclination of the vehicle body, movements of the steering torque, and operation by the driver against the one-side pull behavior, observed when the driver drives the vehicle C and travels on a road. FIG. 5A illustrates a scene where the vehicle is traveling on a flat straight road without anti-one-side pull control. FIG. 5B illustrates a scene where the vehicle is traveling on a cant road without anti-one-side pull control (before the anti-one-side pull control is turned on). FIG. 5C illustrates a scene where the vehicle is traveling on a cant road with anti-one-side pull control (after the anti-one-side pull control is turned on).

FIG. 6A is a diagram illustrating the relationship between the external force applied on the vehicle C on a cant road and operation by the driver against the one-side pull behavior. FIG. 6B is a diagram illustrating the relationship between the external force applied on the vehicle C on a cant road, whose inclination differs lane by lane, and operation by the driver against the one-side pull behavior.

[Flat Straight Road]

While traveling on a flat straight road illustrated in FIG. 5A, the body of the vehicle C takes a substantially horizontal posture with respect to the roll direction. The steering angle of the steering wheel H at this time is essentially located substantially at the center. The steering torque shows such transition characteristics that the steering torque repeats minute fluctuations from side to side about the midpoint (neutral position of the steering system).

Note that the flat straight road means a straight road (not a cant road) having substantially no inclination in the width direction of the road. In this case, it does not matter whether or not the road has vertical undulation (height difference) in the traveling direction.

Suppose that the driver of the vehicle C turns on the CC switch SW placed on the steering wheel H while traveling on the flat straight road illustrated in FIG. 5A. Then, the cruise control unit 21 of the FI_ECU 2 illustrated in FIG. 2 performs cruise control on the vehicle C by adjusting the opening of the drive-by-wire (DBW) valve 5 and thereby adjusting the vehicle speed V so as to keep a distance from the vehicle ahead at a predetermined value. This frees the driver from burdensome operation of the acceleration pedal for cruising.

In addition, when the CC switch SW is turned on, the cruise control unit 21 of the FI_ECU 2 outputs, to the switch 14, a signal indicating that the CC switch SW has been turned on. Triggered by this signal, the switch 14 passes the target current value, output from the wheel-alignment support controlling unit 12 for canceling the one-side pull, to the limiter 15 in the subsequent stage while blocking the zero current value output from the zero-current-value outputting unit 13. The adder 16 adds the target current value output from the wheel-alignment support controlling unit 12 to the target current value output from the EPS controlling unit 11, and then outputs the target current value subjected to this addition process to the electric motor driving unit 17.

However, in the scene where the vehicle is traveling on a flat straight road, as illustrated in FIG. 5A, the steering torque shows such transition characteristics that the steering torque repeats minute fluctuations from side to side about the midpoint (neutral position of the steering system). Hence, the added torque value (integrated torque value) added up by the integrating unit 1205 illustrated in FIG. 4A never exceeds the midpoint movement judgment threshold set by the midpoint steering angle moving amount setting unit 1206.

In other words, in the scene where the vehicle is traveling on a flat straight road, the midpoint steering angle moving amount setting unit 1206 illustrated in FIG. 4A outputs an initial value (e.g., 0 degree) as the anti-one-side pull steering angle value. The wheel-alignment support current value setting unit 122 illustrated in FIG. 3A converts, based on the mapping information (steering angle-current characteristics), the amount of movement of the anti-one-side pull steering angle value (0 degree in this case) to the base current value. Here, in the scene where the vehicle is traveling on a flat straight road, all of the steering torque, the steering angle, and the rotation speed of the electric motor (time-differentiated value of the steering angle) are small. Accordingly, the anti-one-side pull steering angle value output from the wheel-alignment support controlling unit 12 results in zero or a minute value close to zero.

Thus, in the scene where the vehicle is traveling on a flat straight road, even if the anti-one-side pull current value output from the wheel-alignment support controlling unit 12 is added to the target current value output from the EPS controlling unit 11 in response to the event where the CC switch SW is turned on by the driver, a current value having substantially the same magnitude as the target current value output from the EPS controlling unit 11 is fed to the electric motor driving unit 17.

Note that, although the vehicle C according to this embodiment has been described with an example where the functional units belonging to the wheel-alignment support controlling unit 12 operate constantly to produce the anti-one-side pull current value successively, the present invention is not limited to this example. The vehicle may alternatively employ a configuration where the functional units, which belong to the wheel-alignment support controlling unit 12 and have been in sleep mode, are triggered to operate constantly by the turn-on of the CC switch SW.

[Cant Road (Before Anti-One-Side Pull Control is Turned on)]

As illustrated in FIG. 5B, on a cant road which is a road inclined in the width direction, a one-side pull behavior occurs in the vehicle C due to the gravity. On a cant road which is inclined downward to the left as illustrated in FIG. 5B, a one-side pull behavior toward the left occurs in the vehicle C. To cope with this one-side pull behavior, the driver performs a wheel alignment operation of keeping the steering angle at which the steering wheel H is turned to the right.

The vehicle steering device S according to the embodiment of the present disclosure includes the electric power steering system having the EPS controlling unit 11 that performs control to assist the driver in producing a force required for steering. Thus, according to the vehicle steering device S, it is possible to set a target current value that matches the magnitude of the steering torque, and to flow, through the electric motor 3, a current with a value having a magnitude according to that of the target current value.

For example, in the United States, there is a road where a cant road continues endlessly for the purpose of improving drainage of the road. On a cant road inclined downward to the left as illustrated in FIG. 5B, a one-side pull behavior of the vehicle C occurs downward in the inclination direction if an external force generated according to the angle of inclination of the cant road exceeds a resistance force generated by friction and the like. In order to keep the vehicle traveling straight against this one-side pull behavior, the driver is forced to perform a wheel alignment operation of keeping the steering wheel H turned to the right. This imposes a physical burden for steering on the driver, which impairs steering comfort for the driver.

Suppose that the vehicle C has moved from a flat straight road to the cant road inclined downward to the left as illustrated in FIG. 5B, and that the CC switch SW has been turned on already while the vehicle C travels on the flat straight road. On the cant road, a one-side pull behavior of the vehicle C occurs.

Hence, to cope with the one-side pull behavior of the vehicle C, the driver performs a wheel alignment operation of keeping the steering wheel H turned to the right. The vehicle C can be kept traveling straight if a force to make the vehicle C drift to the left on the cant road balances with a resistance force generated in the vehicle C by turning the steering wheel H to the right. However, if such a state lasts for a long time, this imposes a relatively large physical burden on the driver.

At this time, as illustrated in FIG. 4A, the added value of the steering torque passing through the low-pass filter 1201 and the torque obtained by converting an output current from the electric motor 3 in the torque converting unit 1202 increases. In addition, the added torque obtained by integration in the integrating unit 1205 also keeps increasing.

The midpoint movement cancellation judging unit 1204 generates a cancellation signal for canceling the movement of the midpoint (movement permission flag: movement prohibited mode, see FIG. 4B), based on the assumption that the movement of the midpoint (correction of the anti-one-side pull steering angle value) by the anti-one-side pull control is not needed, when either one of the conditions including: that the yaw rate exceeds the predetermined threshold; that the rotation speed of the electric motor exceeds the predetermined threshold; and that the vehicle speed V falls below the third threshold Vth3 (see FIG. 4B) is satisfied, and outputs the cancellation signal to the integrating unit 1205 in the subsequent stage. Upon receipt of this cancellation signal, the integrating unit 1205 sets the integrated torque value to zero. Conceivable timings where the above cancellation condition is satisfied include, for example, during a lane change, during a right or left turn at an intersection, during an abrupt operation of the steering wheel H, and during a traffic congestion.

The midpoint steering angle moving amount setting unit 1206 judges whether or not the integrated torque value, output from the integrating unit 1205 successively, exceeds the preset midpoint movement judgment threshold and, when the integrated torque value exceeds the midpoint movement judgment threshold, outputs a control signal, indicating instructions for the movement of the midpoint, to the subtracting unit 121 illustrated in FIG. 3A as an output from the midpoint movement controlling unit 120.

Note that, even when the CC switch SW is being turned on, the force required for the driver to align the steering wheel is not reduced unless the integrated torque value exceeds the midpoint movement judgment threshold. This is because the magnitude of the anti-one-side pull current value, output from the wheel-alignment support controlling unit 12 when the integrated torque value is equal to or below the midpoint movement judgment threshold, is considered to be not large enough to require the wheel alignment support. Incidentally, the smaller the midpoint movement judgment threshold is set, the shorter the standby time before the turn-on of the anti-one-side pull control becomes.

[Cant Road (after Anti-One-Side Pull Control is Turned on)]

As illustrated in FIG. 5C, when the anti-one-side pull control by the EPS_ECU 1 is being turned on, even on the same cant road as in FIG. 5B, the midpoint movement controlling unit 120 of the wheel-alignment support controlling unit 12 illustrated in FIG. 3A performs anti-one-side pull control to move the midpoint. In the EPS_ECU 1 illustrated in FIG. 2, the adder 16 adds the anti-one-side pull current value, output from the wheel-alignment support controlling unit 12 illustrated in FIG. 3A, to the target current value output from the EPS controlling unit 11. Then, the electric motor driving unit 17 illustrated in FIG. 2 generates an actual current to be fed to the electric motor 3.

By turning on the anti-one-side pull control for suppressing the one-side pull behavior of the vehicle C, even in a situation where the one-side pull behavior of the vehicle C occurs, the EPS_ECU 1 can reduce a physical burden for the driver to align the steering wheel H, and realize steering with the same burden as that imposed on a flat straight road. Here, turning on the anti-one-side pull control means starting the anti-one-side pull control.

In this embodiment, as illustrated in FIG. 3A, the multiplying unit 131 multiplies the base current value, set in the wheel-alignment support current value setting unit 122 and subjected to the high-frequency component removing process in the low-pass filter 123, by the first ratio output from the first ratio outputting unit 124 and the vehicle speed ratio output from the vehicle speed ratio outputting unit 125. Then, the adding unit 133 adds the damper current value, output from the damper current value setting unit 126, to the base current value having been multiplied by the first ratio and the vehicle speed ratio.

Then, the multiplying unit 128 multiplies the current value subjected to the above addition process by the second ratio output from the second ratio outputting unit 127. The damper current value subjected to this multiplication process takes a large value for a quick steering operation, and takes a small value for a strong steering operation (such as a right or left turn, a lane change, or a bypass action). The adding unit 133 adds the damper current value subjected to this multiplication process to the base current value.

The wheel-alignment support controlling unit 12 performs control to feed the electric motor 3 with a driving current that assists the driver so that the wheel alignment position (midpoint steering angle) of the steering wheel H may not be fluctuated even under the influence of a disturbance (external force) such as a cant road or a crosswind.

The wheel-alignment support controlling unit 12 outputs, as the anti-one-side pull current value, the base current value to which the damper current value has been added in the adding unit 133 after being multiplied by the first ratio and the vehicle speed ratio in the multiplying unit 131. The adder 16 adds the anti-one-side pull target current value, output from the wheel-alignment support controlling unit 12 illustrated in FIG. 3A, to the target current value output from the EPS controlling unit 11. Upon receipt of the target current value subjected to this addition process, the electric motor driving unit 17 illustrated in FIG. 2 generates an actual current to be fed to the electric motor 3.

In the vehicle C according to this embodiment, when the anti-one-side pull control is on, the EPS_ECU 1 performs control to drive the electric motor 3 to suppress the one-side pull behavior of the vehicle C even on a cant road or in a situation where a crosswind blows. Thereby, a physical burden required for the driver to align the steering wheel during traveling on a cant road is reduced to the same level as that imposed during traveling on a flat straight road. The anti-one-side pull control executed by the EPS_ECU 1 is terminated when the vehicle steering device S is turned off or when the CC switch SW is turned off by the driver.

When either one of the conditions including: that the yaw rate exceeds the predetermined threshold; that the rotation speed of the electric motor exceeds the predetermined threshold; and that the vehicle speed V is below the predetermined threshold Vth3 (see FIG. 4B) is satisfied, the integrated torque value obtained by adding up the added torque in the integrating unit 1205 is cleared to zero by an instruction from the midpoint movement cancellation judging unit 1204, and thereby the movement of the midpoint (correction of the anti-one-side pull steering angle value) in the wheel-alignment support current value setting unit 122 is no longer performed. However, since the anti-one-side pull control itself is kept on, the wheel-alignment support controlling unit 12 executes anti-one-side pull control based on the anti-one-side pull steering angle value that is stored and held in the midpoint steering angle moving amount setting unit 1206.

[Flowchart Representing Associative Operation Between Cruise Control and Anti-One-Side Pull Control]

Next, the operation of the vehicle steering device S according to this embodiment is described with reference to FIG. 7A. FIG. 7A is a flowchart schematically illustrating the association between cruise control and anti-one-side pull control according to this embodiment.

In step S1 illustrated in FIG. 7A, the EPS_ECU 1 checks whether or not the cruise control active flag is output from the cruise control unit 21 of the FI_ECU 2 to judge whether or not the vehicle C is under cruise control. Here, the cruise control active flag is information output from the cruise control unit 21 of the FI_ECU 2 when the CC switch SW is turned on by the driver.

If it is judged that the vehicle is under cruise control ("Yes" in step S1) as a result of the judgment in step S1, the process of the EPS_ECU 1 proceeds to the next step S2.

On the other hand, if it is judged that the vehicle is not under cruise control ("No" in step S1) as a result of the judgment in step S1, the process of the EPS_ECU 1 jumps to step S3.

In step S2, in response to the judgment that the vehicle is under cruise control, the wheel-alignment support controlling unit 12 of the EPS_ECU 1 performs control to turn on the wheel-alignment support control (anti-one-side pull control). In this respect, the judgment that the vehicle is under control is made when the CC switch SW is on.

On the other hand, in step S3, in response to the judgment that the vehicle is not under cruise control, the wheel-alignment support controlling unit 12 of the EPS_ECU 1 performs control to turn off the wheel-alignment support control (anti-one-side pull control). In this respect, the judgment that the vehicle is not under control is made when the CC switch SW is off.

[Time Chart Representing Associative Operation with on/Off Mode of CC Switch SW]

Next, the operation of the vehicle steering device S according to this embodiment is described in time series.

FIG. 7B(a) is a time chart illustrating the temporal transition of the position of the CC switch. FIG. 7B (b) is a time chart illustrating the temporal transition of the actual steering angle of the steering wheel H. FIG. 7B(c) is a time chart illustrating the temporal transition of the anti-one-side pull steering angle having a steering angle θ at time t2 as its initial value. FIG. 7B(d) is a time chart of the anti-one-side pull control schematically illustrating the temporal transition of the anti-one-side pull steering angle having a steering angle of zero at time t2 as its initial value.

First, at time t1, the CC switch SW is off (see FIG. 7B(a)). At time t1, the actual steering angle of the steering wheel H is located at a zero position (neutral position of the steering system) (see FIG. 7B(b)). The anti-one-side pull steering angle value illustrated in FIG. 7B(c) is set in such a way that, when the steering angle of the steering wheel H is below the predetermined steering angle threshold, its initial value is set to the steering angle of the steering wheel H at that time. In the example of FIG. 7B(b), it is assumed that the steering angle of the steering wheel H is below the predetermined steering angle threshold. In this case, the anti-one-side pull steering angle value is 0. Meanwhile, the initial value of the anti-one-side pull steering angle value illustrated in FIG. 7B(d) is set to zero. In this case, the anti-one-side pull steering angle value is zero.

During a period between time t1 and time t2, the CC switch SW is kept off (see FIG. 7B(a)). During the period between time t1 and time t2, the actual steering angle of the steering wheel H increases gradually. This is because, in response to an event where the vehicle C enters a cant road and starts exhibiting a one-side pull behavior, the driver keeps steering the steering wheel H against this behavior. However, during the period between time t1 and time t2, the anti-one-side pull steering angle value illustrated in FIGS. 7B(c) and 7B(d) remains at zero.

At time t2, the CC switch SW is turned on, and switched from off to on (see FIG. 7B(a)). At the timing of time t2, the cruise control unit 21 outputs the cruise control active flag to the wheel-alignment support controlling unit 12. Upon receipt of this flag, the wheel-alignment support controlling unit 12 starts preparing for the anti-one-side pull control. At time t2, the actual steering angle of the steering wheel H has a value of θ (see FIG. 7B(b)).

Here, suppose that the integrated torque value has exceeded the predetermined threshold at time t2. Thereby, at time t2, the condition for starting the anti-one-side pull control (the CC switch SW is on and the integrated torque value exceeds the predetermined threshold) is satisfied. As a result, at time t2, the anti-one-side pull steering angle value (initial value) illustrated in FIG. 7B(c) becomes θ. On the other hand, the anti-one-side pull steering angle value (initial value) illustrated in FIG. 7B(d) becomes zero.

After time t2, the CC switch SW is kept on (see FIG. 7B(a)). After time t2, the actual steering angle of the steering wheel H keeps increasing gradually. This is because, in response to an event where the vehicle C keeps traveling on the cant road and keeps exhibiting the one-side pull behavior after time t2, the driver keeps steering the steering wheel H against this behavior.

After time t2, in response to a gradual increase in the actual steering angle of the steering wheel H, the anti-one-side pull steering angle value increases stepwise as illustrated in FIGS. 7B(c) and 7B(d). As a result, it is possible to reduce labor required for the driver to align the steering wheel H. At this time, the driver can keep driving the vehicle while having a comfortable steering feeling without feeling a sense of discomfort against the event where the neutral position of the steering angle of the steering wheel H has moved.

If the anti-one-side pull control is started while the vehicle C is turning and the actual steering angle of the steering wheel H at this time is set as the initial value of the anti-one-side pull steering angle value, an excessive anti-one-side pull steering angle value is set, which gives a sense of discomfort to the driver. In this regard, if 0 degree is set as the initial value of the anti-one-side pull steering angle value, the driver does not have to feel the sense of discomfort described above.

Meanwhile, during the transition period of the vehicle C from the turning state to the straight travel state, even when the yaw rate falls below the predetermined threshold, the midpoint movement cancellation judging unit 1204 keeps outputting the midpoint movement cancellation signal to the integrating unit 1205 until the predetermined standby time elapses. The purpose of this action is to prevent the added torque value obtained during the transition period from the turning state to the straight travel state from being reflected to the integrated torque value in the integrating unit 1205, because there are fluctuations of the steering torque and the like during this period.

Summary of this Embodiment

The vehicle steering device S according to a first aspect (1) includes the EPS_ECU (controller) 1 configured to control the driving current of the electric motor 3 based on the steering torque and thereby perform control to apply an assist torque on the steering system.

The EPS_ECU 1 includes the wheel-alignment support controlling unit (anti-one-side pull controlling unit) 12 configured to compute the anti-one-side pull current value that is to be fed to the electric motor 3 for suppressing the one-side pull behavior of the vehicle C.

The wheel-alignment support controlling unit (anti-one-side pull controlling unit) 12 has: the integrating unit 1205 configured to calculate the integrated torque value that is the integrated value of the steering torque; the anti-one-side pull steering angle value calculating unit 91 configured to calculate, according to the integrated torque value, the amount of displacement of the anti-one-side pull steering angle value that corresponds to the midpoint steering angle of the steering system for suppressing the one-side pull behavior of the vehicle; and the wheel-alignment support current value setting unit (mapping information storing unit) 122 configured to store the mapping information (steering angle-current characteristics) in which the amount of displacement of the anti-one-side pull steering angle value and the anti-one-side pull current value corresponding to this amount are associated with each other.

The wheel-alignment support controlling unit (anti-one-side pull controlling unit) 12 computes the anti-one-side pull current value corresponding to the amount of displacement of the anti-one-side pull steering angle value with reference to the mapping information (steering angle-current characteristics).

Now consider a case where the driver drives the vehicle C straight under cruise control in a situation where the vehicle C drifts to the left in its travel direction under the influence of a disturbance such as a cant road or a crosswind. In this case, the driver attempts to drive the vehicle C straight under cruise control against the tendency of the vehicle C to drift to the left in the travel direction, by keeping steering the steering wheel H to the right in the travel direction. In this situation, anti-one-side pull control is performed to suppress the one-side pull behavior of the vehicle C by reducing the steering torque to the right in the travel direction based on the integrated value of the torque to the right in the travel direction. This reduces a physical burden on the driver, who is otherwise forced to keep steering the steering wheel H to the right in the travel direction.

In addition, when the vehicle is under cruise control and the vehicle speed V is below the predetermined threshold (low vehicle speed value preset and changeable as appropriate: the first threshold Vth1 or the third threshold Vth3), the wheel-alignment support controlling unit (anti-one-side pull controlling unit) 12 performs control to make the amount of displacement of the anti-one-side pull steering angle value smaller than that obtained when the vehicle speed V is equal to or above the predetermined threshold. As a result, it is possible to reduce fluctuations of the anti-one-side pull steering angle value caused in the case where the vehicle is under cruise control and the vehicle speed V is below the predetermined threshold (where fluctuations of the anti-one-side pull steering angle value are likely to occur).

Here, the case where the vehicle speed V is below the predetermined threshold includes not only the case where the vehicle speed V falls below the predetermined threshold but also the case where a period during which the vehicle speed V is below the predetermined threshold exceeds a predetermined period of time (length of time preset and changeable as appropriate). Likewise, the case where the vehicle speed V is equal to or above the predetermined threshold includes not only the case where the vehicle speed V becomes equal to or above the predetermined threshold but also the case where a period during which the vehicle speed V is equal to or above the predetermined threshold exceeds a predetermined period of time (length of time preset and changeable as appropriate).

According to the vehicle steering device S of the first aspect (1), even if the vehicle speed V of the vehicle C transitions to the high vehicle speed range through the low vehicle speed range when the driver is driving the vehicle C straight under cruise control in the situation where the one-side pull behavior of the vehicle C occurs, such as during traveling on a cant road or during traveling in a crosswind, it is possible to converge the anti-one-side pull steering angle value, which corresponds to the midpoint steering angle of the steering system for suppressing the one-side pull behavior of the vehicle C, to a proper value quickly, and thereby provide steering comfort to the driver.

In addition, in the vehicle steering device S according to a second aspect (2), the cruise control unit 21 performs cruise control to keep a distance from the vehicle ahead at a predetermined value.

According to the vehicle steering device S of the second aspect (2), the cruise control unit 21 serves to perform cruise control to keep the distance from the vehicle ahead at the predetermined value; thus, even if the vehicle speed V transitions to the high vehicle speed range through the low vehicle speed range due to the workings of this cruise control, it is possible to converge the anti-one-side pull steering angle value, which corresponds to the midpoint steering angle of the steering system for suppressing the one-side pull behavior of the vehicle C, to a proper value quickly. Accordingly, as in the case of the vehicle steering device S of the first aspect (1), it is possible to provide steering comfort to the driver.

In addition, the vehicle steering device S according to a third aspect (3) employs a configuration where, when the vehicle speed V falls below the predetermined threshold (low vehicle speed value preset and changeable as appropriate: the first threshold Vth1 or the third threshold Vth3), the wheel-alignment support controlling unit (anti-one-side pull controlling unit) 12 keeps the anti-one-side pull steering angle value at a value obtained just before the vehicle speed V falls below the predetermined threshold.

According to the vehicle steering device S of the third aspect (3), when the vehicle speed V falls below the predetermined threshold, the wheel-alignment support controlling unit (anti-one-side pull controlling unit) 12 keeps the anti-one-side pull steering angle value at a value obtained just before the vehicle speed V falls below the predetermined threshold; thus, it is possible to prevent fluctuations of the anti-one-side pull steering angle value. Accordingly, even if the vehicle speed V of the vehicle C transitions to the high vehicle speed range through the low vehicle speed range when the driver is driving the vehicle C straight under cruise control in the situation where the one-side pull behavior of the vehicle C occurs, such as during traveling on a cant road or during traveling in a crosswind, it is possible to converge the anti-one-side pull steering angle value, which corresponds to the midpoint steering angle of the steering system for suppressing the one-side pull behavior of the vehicle C, to a proper value further quickly, and thereby provide high-level steering comfort to the driver.

In the low vehicle speed range where the vehicle speed V is below the predetermined threshold, the vehicle C is relatively less likely to be affected by the inclination of a cant road. Moreover, in the low vehicle speed range as described above, the movement of the midpoint to an improper steering angle value (fluctuations of the anti-one-side pull steering angle value) is likely to occur.

To cope with this, the vehicle steering device S according to a fourth aspect (4) employs a configuration where, when the vehicle is under cruise control and the vehicle speed V is below the predetermined threshold (low vehicle speed value preset and changeable as appropriate: the first threshold Vth1: see FIG. 3B), the wheel-alignment support controlling unit (anti-one-side pull controlling unit) 12 performs control to make the amount of control involved in the anti-one-side pull control (anti-one-side pull current value) smaller than the amount of control involved in the anti-one-side pull control (anti-one-side pull current value) obtained when the vehicle speed V is equal to or above the predetermined threshold (first threshold Vth1).

According to the vehicle steering device S of the fourth aspect (4), when the vehicle is under cruise control and the vehicle speed V is below the predetermined threshold (first threshold Vth1), the wheel-alignment support controlling unit (anti-one-side pull controlling unit) 12 makes the amount of control involved in the anti-one-side pull control (anti-one-side pull current value) smaller than the amount of control involved in the anti-one-side pull control (anti-one-side pull current value) obtained when the vehicle speed V is equal to or above the predetermined threshold (first threshold Vth1); thus, it is possible to reduce and optimize the rate of operation of the anti-one-side pull control in the vehicle speed range (the vehicle speed V is below the first threshold Vth1) in which the one-side pull behavior of the vehicle is less likely to occur.

Other Embodiments

The embodiments described above represent examples in which the present disclosure is embodied. Hence, these should not be construed as limiting the technical scope of the present invention. This is because the present invention may be embodied in various modes without departing from the spirit or major features of the present invention.

For example, the description of the embodiment of the present disclosure has been given with the example where the third threshold Vth3 (low vehicle speed value preset and changeable as appropriate: e.g., 40 km per hour) is set smaller than the first threshold Vth1 (low vehicle speed value preset and changeable as appropriate: e.g., 50 km per hour), but the present invention is not limited to this example. Instead, the third threshold Vth3 and the first threshold Vth1 may be set at a common value.

Further, the description of the embodiment of the present disclosure has been given with the example where the midpoint steering angle moving amount setting unit 1206 sets, based on the integrated torque value, the amount of movement (amount of displacement) of the anti-one-side pull steering angle value that corresponds to the midpoint steering angle of the steering wheel H for suppressing the one-side pull behavior of the vehicle C.

However, it is also possible to employ a configuration where the midpoint steering angle moving amount setting unit 1206 increases the amount of movement (amount of displacement) of the anti-one-side pull steering angle value as the integrated torque value or the moving average value of the added torque value increases.

In this case, the device may be configured so that, if a disturbance occurs in the vehicle behavior (e.g., if the yaw rate or the steering angle suddenly changes), the integrated torque value is cleared to zero or the moving average value of the added torque value is cleared to zero to remove a setting error in the amount of movement (amount of displacement) of the anti-one-side pull steering angle value.

Further, in the description of the embodiment of the present disclosure, the switch 14 and the zero-current-value outputting unit 13 are not essential constituents. Hence, the vehicle steering device S according to this embodiment may be configured without these.

Further, the description of the embodiment of the present disclosure has been given with the exemplary configuration where the midpoint steering angle moving amount setting unit 1206 sets the amount of movement (amount of displacement) of the anti-one-side pull steering angle value in accordance with the predetermined procedure when the integrated torque value exceeds the midpoint movement judgment threshold, but the present invention is not limited to this example. For example, the technical scope of the present invention may include a mode where the midpoint steering angle moving amount setting unit sets the amount of movement (amount of displacement) of the anti-one-side pull steering angle value according to the magnitude of the integrated torque value obtained by multiplying the integrated torque value by a predetermined coefficient.

Further, the description of the embodiment of the present disclosure has been given with the example where the present invention is applied to the vehicle C equipped with an internal combustion engine, but the present invention is not limited to this example. The vehicle steering device S according to the present disclosure is applicable to any kind of vehicle such as an electric vehicle and a fuel cell vehicle. Incidentally, when the present invention is applied to the vehicle C such as an electric vehicle and a fuel cell vehicle, the cruise control on the vehicle C may be implemented, for example, by performing driving control over a driving motor inverter.

Further, the technical idea of the present disclosure can be applied in the same way to a situation where, for example, when the hull of a small boat is forced to flow laterally by a tide or a crosswind and thus exhibits a one-side pull behavior, an operator of the boat aligns the steering wheel for steering the boat according to the extent of the one-side pull. In this case, the present invention can be applied to a boat or other transportation means by replacing the term "vehicle" in the claims by the boat or other transportation means. The term "vehicle" in the claims may cover the boat or other transportation means.

We claim:

1. A vehicle steering device comprising:
    an electric motor configured to apply an assist torque to assist steering of a steering system of a vehicle;
    a steering torque detecting unit configured to detect a steering torque required for steering said steering system;
    a steering angle detecting unit configured to detect a steering angle of said steering system;
    a vehicle speed detecting unit configured to detect a vehicle speed;
    a cruise control unit configured to perform cruise control to keep a vehicle speed of the vehicle at a predetermined value; and
    a controller configured to control a driving current of said electric motor based on said steering torque to perform control of said assist torque to said steering system, wherein
    said controller further includes an anti-one-side pull controlling unit configured to compute an anti-one-side pull current value that is to be fed to said electric motor for suppressing a one-side pull behavior of said vehicle,
    said anti-one-side pull controlling unit comprises:
        an integrating unit configured to calculate an integrated torque value that is an integrated value of said steering torque;
        an anti-one-side pull steering angle value calculating unit configured to calculate, according to said integrated torque value, the amount of displacement of an anti-one-side pull steering angle value that corresponds to a midpoint steering angle of said steering system for suppressing the one-side pull behavior of said vehicle; and
        a mapping information storing unit configured to store mapping information in which the amount of displacement of said anti-one-side pull steering angle value and said anti-one-side pull current value corresponding to the amount of displacement of said anti-one-side pull steering angle value are associated with each other,
    said anti-one-side pull controlling unit:
        computes said anti-one-side pull current value corresponding to the amount of displacement of said anti-one-side pull steering angle value with reference to said mapping information, and,
        when said vehicle is under said cruise control and said vehicle speed is below a predetermined threshold, performs control to make the amount of displacement of said anti-one-side pull steering angle value smaller than that obtained when said vehicle speed is equal to or above said predetermined threshold,
    wherein the amount of displacement of the anti-one-side pull steering angle value corresponds to the amount of moving of the midpoint of said steering system.

2. The vehicle steering device according to claim 1, wherein said cruise control unit performs cruise control to keep a distance from a vehicle ahead at a predetermined value.

3. The vehicle steering device according to claim 1, wherein, when said vehicle speed falls below said predetermined threshold, said anti-one-side pull controlling unit keeps said anti-one-side pull steering angle value at a value obtained just before said vehicle speed falls below said predetermined threshold.

4. The vehicle steering device according to claim 1, wherein, when said vehicle is under cruise control and said vehicle speed is below said predetermined threshold, said anti-one-side pull controlling unit performs control to make the amount of control involved in anti-one-side pull control smaller than the amount of control involved in said anti-one-side pull control obtained when said vehicle speed is equal to or above said predetermined threshold.

5. The vehicle steering device according to claim 4, wherein the anti-one-side pull controlling unit makes the anti-one-side pull current value smaller when said vehicle is under cruise control and said vehicle speed is below said predetermined threshold than that when said vehicle speed is equal to or above said predetermined threshold.

6. The vehicle steering device according to claim 1, wherein the anti-one-side pull controlling unit determines whether the integrated torque value exceeds a predetermined threshold value, and if so, computes said anti-one-side pull current value with reference to said mapping information.

7. The vehicle steering device according to claim 1, wherein the anti-one-side pull controlling unit:

increases the amount of displacement of an anti-one-side pull steering angle value as the integrated torque value increases, determines whether the vehicle is under said cruise control and said vehicle speed is below the predetermined threshold, and if so, reduces the amount of displacement of the anti-one-side pull steering angle value.

8. The vehicle steering device according to claim 3, wherein, when said vehicle speed falls below said predetermined threshold, said anti-one-side pull controlling unit stops update of the anti-one-side pull steering angle value and maintains existing value of the anti-one-side pull steering angle value.

9. The vehicle steering device according to claim 8, wherein said anti-one-side pull controlling unit updates the anti-one-side pull steering angle value in accordance with the integrated torque value.

10. A vehicle comprising the vehicle steering device according to claim 1.

11. A vehicle steering device comprising:
an electric motor configured to apply an assist torque to assist steering of a steering mechanism of a vehicle;
a steering torque detector configured to detect a steering torque required for steering said steering mechanism;
a steering angle detector configured to detect a steering angle of said steering mechanism;
a vehicle speed detector configured to detect a vehicle speed;
a cruise controller configured to perform cruise control to keep a vehicle speed of the vehicle at a predetermined value; and
a controller configured to control a driving current of said electric motor based on said steering torque to perform control of said assist torque to said steering mechanism, wherein said controller further includes an anti-one-side pull controller configured to compute an anti-one-side pull current value that is to be fed to said electric motor for suppressing a one-side pull behavior of said vehicle,
said anti-one-side pull controller comprises:
an integrating controller configured to calculate an integrated torque value that is an integrated value of said steering torque;
an anti-one-side pull steering angle value calculating controller configured to calculate, according to said integrated torque value, the amount of displacement of an anti-one-side pull steering angle value that corresponds to a midpoint steering angle of said steering mechanism for suppressing the one-side pull behavior of said vehicle; and
a mapping information memory device configured to store mapping information in which the amount of displacement of said anti-one-side pull steering angle value and said anti-one-side pull current value corresponding to the amount of displacement of said anti-one-side pull steering angle value are associated with each other,
said anti-one-side pull controller:
computes said anti-one-side pull current value corresponding to the amount of displacement of said anti-one-side pull steering angle value with reference to said mapping information, and,
when said vehicle is under said cruise control and said vehicle speed is below a predetermined threshold, performs control to make the amount of displacement of said anti-one-side pull steering angle value smaller than that obtained when said vehicle speed is equal to or above said predetermined threshold,
wherein the amount of displacement of the anti-one-side pull steering angle value corresponds to the amount of moving of the midpoint of said steering system.

12. The vehicle steering device according to claim 1, wherein when said vehicle is under said cruise control and said vehicle speed is below a predetermined threshold, said anti-one-side pull controlling unit resets the integrated torque value to zero to prohibit moving of the midpoint of said steering system.

13. The vehicle steering device according to claim 11, wherein when said vehicle is under said cruise control and said vehicle speed is below a predetermined threshold, said anti-one-side pull controller resets the integrated torque value to zero to prohibit moving of the midpoint of said steering system.

* * * * *